(12) United States Patent
Bandhauer

(10) Patent No.: US 10,128,530 B2
(45) Date of Patent: Nov. 13, 2018

(54) MULTI-FUNCTIONAL ELECTROLYTE FOR THERMAL MANAGEMENT OF LITHIUM-ION BATTERIES

(71) Applicant: COLORADO STATE UNIVERSITY RESEARCH FOUNDATION, Fort Collins, CO (US)

(72) Inventor: Todd Bandhauer, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 15/953,965

(22) Filed: Apr. 16, 2018

(65) Prior Publication Data

US 2018/0233774 A1    Aug. 16, 2018

Related U.S. Application Data

(60) Division of application No. 15/668,232, filed on Aug. 3, 2017, now Pat. No. 9,947,961, which is a (Continued)

(51) Int. Cl.
*H01M 10/0525* (2010.01)
*H01M 4/505* (2010.01)
(Continued)

(52) U.S. Cl.
CPC ....... *H01M 10/0525* (2013.01); *H01M 4/505* (2013.01); *H01M 4/525* (2013.01); *H01M 10/0564* (2013.01)

(58) Field of Classification Search
CPC ... H01M 10/0525; H01M 4/505; H01M 4/525
See application file for complete search history.

(56) References Cited

U.S. PATENT DOCUMENTS 9,184,468 B2    11/2015    Tikhonov et al.
2002/0034692 A1    3/2002    Appel et al.
(Continued)

FOREIGN PATENT DOCUMENTS

WO    2014176320 A3    3/2015
WO    2015066359 A1    5/2015
(Continued)

OTHER PUBLICATIONS

Arai, J., "A Novel Non-Flammable Electrolyte Containing Methyl Nonafluorobutyl Ether for Lithium Secondary Batteries," J Appl Electrochem., 32(10):1071-1079, Oct. 2002.
(Continued)

*Primary Examiner* — Sarah A. Slifka
(74) *Attorney, Agent, or Firm* — Haukaas Fortius PLLC; Michael H. Haukaas

(57) ABSTRACT

The high thermal conduction resistances of a lithium-ion battery (LIB) severely limit the effectiveness of a conventional external thermal management system (TMS). A method for a new thermal management system for lithium-ion batteries that utilizes a multi-functional electrolyte (MFE) to remove heat locally inside the cell by evaporating a volatile component of the MFE is disclosed. These new electrolyte mixtures comprise a high vapor pressure co-solvent. The characteristics of a previously unstudied high vapor pressure co-solvent HFE-7000 (65 kPa at 25° C.) in an MFE (1 M LiTFSI in 1:1 HFE-7000/EMC), and other possible MFE compositions that can be utilized in a custom electrolyte boiling facility, are disclosed.

20 Claims, 21 Drawing Sheets

Related U.S. Application Data continuation of application No. PCT/US2017/021586, filed on Mar. 9, 2017.

(60) Provisional application No. 62/310,278, filed on Mar. 18, 2016.

(51) Int. Cl.
  *H01M 4/525*  (2010.01)
  *H01M 10/0564*  (2010.01)

(56) References Cited

U.S. PATENT DOCUMENTS

| | | |
|---|---|---|
| 2003/0118880 A1 | 6/2003 | Zimmerman et al. |
| 2009/0176148 A1 | 7/2009 | Jiang et al. |
| 2010/0028785 A1 | 2/2010 | Choi et al. |
| 2010/0104938 A1 | 4/2010 | Hermann |
| 2010/0279154 A1 | 11/2010 | Koetting et al. |
| 2012/0148881 A1 | 6/2012 | Quisenberry |
| 2015/0099199 A1 | 4/2015 | Bazant et al. |

FOREIGN PATENT DOCUMENTS

| | | |
|---|---|---|
| WO | 2015074006 A1 | 5/2015 |
| WO | 2016048808 A1 | 3/2016 |

OTHER PUBLICATIONS

Arai, J., "Nonflammable Methyl Nonafluorobutyl Ether for Electrolyte Used in Lithium Secondary Batteries," J Electrochem Soc., 150(2):A219-A228, Jan. 2003.

Bandhauer et al., "Electrochemical-Thermal Modeling to Evaluate Battery Thermal Management Strategies," J Electrochem Soc., 162(1):A125-A136, Jan. 2015.

Bandhauer et al., "Electrochemical-Thermal Modeling to Evaluate Battery Thermal Management Strategies," J Electrochem Soc., 162(1):A137-A148, Jan. 2015.

Bandhauer et al., "Passive, Internal Thermal Management System for Batteries Using Microscale Liquid-vapor Phase Change," Appl. Therm. Eng., 61(2):756-769, Nov. 2013.

International Search Report and Written Opinion of the ISA/US dated Jul. 3, 2017 in International Application No. PCT/US2017/021586; 9pgs.

Xu, K., "Electrolytes and Interphases in Li-Ion Batteries and Beyond," Chem. Rev., 114(23):11503-11618, Oct. 2014.

MULTI-FUNCTIONAL ELECTROLYTE FOR THERMAL MANAGEMENT OF LITHIUM-ION BATTERIES

RELATED APPLICATIONS

This application is a divisional application of U.S. patent application Ser. No. 15/668,232, filed Aug. 3, 2017, which is a continuation under 35 U.S.C. 111(a) of International Application No. PCT/US2017/021586, filed Mar. 9, 2017, which claims priority 35 U.S.C. § 119(e) from U.S. Provisional Application No. 62/310,278, filed Mar. 18, 2016, which applications are incorporated herein by reference.

BACKGROUND OF THE INVENTION

Lithium-ion batteries (LIB) continue to have inherent thermal limitations that severely affect their performance in large battery packs. Large battery packs can consist of tens to thousands of individual cells, all of which generate heat during normal operation. If not properly managed, this heat can cause significant capacity degradation, and, in some cases, the temperature of the cell can trigger thermal runaway. This can increase the temperature of neighboring cells and cause thermal runaway to be triggered. As a result, these packs require a sophisticated thermal management system (TMS). The state-of-the-art TMS provide significant external liquid cooling to each cell within the pack, such as the one seen in the Chevrolet Volt. However, LIB have inherently low thermal conductivity which leads to high temperature gradients through the thickness of the cell. Unfortunately, no commercial TMS is capable of directly managing the internal cell temperature, and, despite significant optimization efforts underway, these TMS still account for a significant percentage of the total pack weight and volume. Accordingly, a practical thermal management system that can provide internal cooling to an electrochemical cell to avoid the overheating problems inherent with current battery technologies would be a benefit to many devices that depend renewable energy.

SUMMARY

The high thermal conduction resistances of lithium-ion batteries severely limit the effectiveness of conventional external thermal management systems. To remove heat from the insulated interior portions of the cell, a large temperature difference is required across the cell, and the center of the electrode stack can exceed the thermal runaway onset temperature even under normal cycling conditions. One potential solution is to remove heat locally inside the cell by evaporating a volatile component of the electrolyte. In this system, a high vapor pressure co-solvent evaporates at a low temperature prior to triggering thermal runaway. The vapor generated is transported to the skin of the cell, where it is condensed and transported back to the internal portion of the cell via surface tension forces. For this system to function, a co-solvent that has a boiling point below the thermal runaway onset temperature must also allow the cell to function under normal operating conditions.

Integrating a thermal management system (TMS) internal to each cell by using a multi-functional electrolyte (MFE) can serve two functions simultaneously: transport of lithium-ions and removal of heat through passive evaporation. As heat is generated within the cell, a volatile electrolyte co-solvent is evaporated in small channels located in the positive electrode (FIG. 1). The evaporated co-solvent is then condensed on the skin of the cell and reincorporated into the liquid electrolyte. The liquid-vapor phase change process absorbs a significant amount of energy per unit mass of volatile co-solvent evaporated, and occurs at a near constant temperature once the bubble point of the mixture is reached. This system has the potential to provide continuous, passive thermal management through the entirety of every cell within a large pack.

Accordingly, this disclosure provides a method for thermal management of a battery, the method comprising:

regulating the temperature of a battery, wherein the battery comprises one or more electrodes perfused with one or more flow channels that are submerged in a multi-functional electrolyte (MFE), and the MFE comprises a mixture of a lithium salt, an organic electrolyte, and a volatile fluorinated hydrocarbon;

wherein when the temperature of the battery exceeds a safe limit, the MFE heats to the bubble point of the MFE,
  a) the fluorinated hydrocarbon phase-changes to a vapor by absorbing thermal energy;
  b) the vapor is released to a condenser by passing through the flow channels in each perfused electrode;
  c) the fluorinated hydrocarbon vapor phase-changes to a liquid-phase by condensing in the condenser; and
  d) the condensed fluorinated hydrocarbon recycles by returning to the MFE;

wherein the battery temperature is regulated by a cycle of a) to d) of absorbing thermal energy, passing the vapors of hydrofluorocarbon through flow channels in the electrode, condensing the vapors to the liquid-phase, and returning the condensed fluorinated hydrocarbon to the MFE, thereby cooling the battery internally.

This disclosure also provides an electrochemical cell with internal thermal management comprising:

an electrode perfused with one or more flow channels that are submerged in a multi-functional electrolyte (MFE), and the MFE comprises a mixture of a lithium salt, an organic electrolyte, and a volatile fluorinated hydrocarbon;

wherein when the temperature of the battery exceeds a safe limit, the MFE heats to the bubble point of the MFE,
  a) the fluorinated hydrocarbon phase-changes to a vapor by absorbing thermal energy;
  b) the vapor is released to a condenser by passing through the flow channels in the perfused electrode;
  c) the fluorinated hydrocarbon vapor phase-changes to a liquid-phase by condensing in the condenser; and
  d) the condensed fluorinated hydrocarbon recycles by returning to the MFE;

wherein the battery temperature is regulated by a cycle of a) to d) of absorbing thermal energy, passing the vapors of hydrofluorocarbon through flow channels in the electrode, condensing the vapors to the liquid-phase, and returning the condensed fluorinated hydrocarbon to the MFE, thereby cooling the electrochemical cell internally.

Additionally, this disclosure provides an internally refrigerated electrochemical cell comprising:

an electrode perfused with one or more flow channels;

a liquid wicking structure embedded within at least one flow channel; and an inert refrigerant that permeates through the wicking structure, and is miscible, partially miscible, or non-miscible with an electrolyte in an electrochemical cell;

wherein when the temperature of the battery exceeds a safe limit,
  a) a refrigerant within the wicking structure phase-changes to a vapor by absorbing thermal energy;

b) the vapor is released to a condenser by passing through the flow channels in the perfused electrode;

c) the refrigerant vapor phase-changes to a liquid-phase by condensing in the condenser; and d) the condensed refrigerant recycles by returning to the flow channels by the wicking structures;

wherein the electrochemical cell temperature is regulated by a cycle of a) to d) of absorbing thermal energy, passing the vapors of refrigerant through flow channels in the electrode, condensing the vapors to the liquid-phase, and returning the condensed refrigerant to the flow channels, thereby cooling the electrochemical cell internally.

Any one of the above embodiments can include a composition of the of the multi-functional electrolyte (MFE), the composition comprising: a fluorinated hydrocarbon and an electrolyte mixture in a ratio of about 1:1; a lithium salt in the mixture in a concentration of about 0.1 molar to about 2 molar, or about 0.1 molal to about 2 molal; and an optional solid electrolyte interphase (SEI) stabilizer; wherein the fluorinated hydrocarbon comprises HFE-7000, HFE-7100, HFE-7200, HFE-7300, HFE-7600, FC-72, perflenapent, R134a, a R400 refrigerant, or a R700 refrigerant, the organic electrolyte comprises ethyl methyl carbonate, diethyl carbonate, dimethyl carbonate, ethylene carbonate, propylene carbonate, vinylene carbonate, fluoroethylene carbonate, or an organic ionic liquid, and the lithium salt comprises lithium hexafluorophosphate ($LiPF_6$), lithium hexafluoroarsenate ($LiAsF_6$), lithium bis(oxalate)borate ($LiB(C_2O_4)_2$), lithium triflate ($LiSO_3CF_3$), lithium bis(trifluromethylsulfonyl)imide (LiTFSI), lithium bis(pentafluroethylsulfonyl)imide (LiBETI), or lithium nonafluorobutylsulfonyl trifluoromethylsulfonyl imide (LiF-BMS).

Furthermore, certain specific embodiments describing low boiling point hydrofluoroethers (HFE) have been proven to be compatible with LIB chemistry. In this disclosure, HFE-7000 and ethyl methyl carbonate (EMC) 1:1 by volume are used to solvate 1.0 M LiTFSI to produce a candidate electrolyte for the proposed cooling system. Copper antimonide ($Cu_2Sb$) and lithium iron phosphate ($LiFePO_4$) are used in a full cell architecture with the candidate electrolyte in a custom electrolyte boiling facility. The facility enables direct viewing of the vapor generation within the full cell and characterizes the galvanostatic electrochemical performance. Test results show that the LFP/$Cu_2$Sb cell is capable of operation even when a portion of the more volatile HFE-7000 is continuously evaporated.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

This disclosure describes a continuous, passive internal thermal management system (TMS) for lithium-ion batteries (LIBs) that utilizes a multi-functional electrolyte (MFE) within the cell to absorb and reject internally generated heat. As shown in FIG. 1, the cell is modified to approximate a loop heat pipe architecture. As heat is generated during cell operation, a volatile electrolyte co-solvent is evaporated in small channels created in the positive electrode where no electrochemical reactions occur. The evaporated co-solvent is then condensed on the interior walls of the cell, such as the thin edge of a LIB cell, and reincorporated into the liquid electrolyte. External air or liquid removes the heat of condensation from the surface of the battery, which can substantially reduce the temperature difference between the center of the cell and the external cooling medium relative to conventional cooling systems.

Figure 1A:
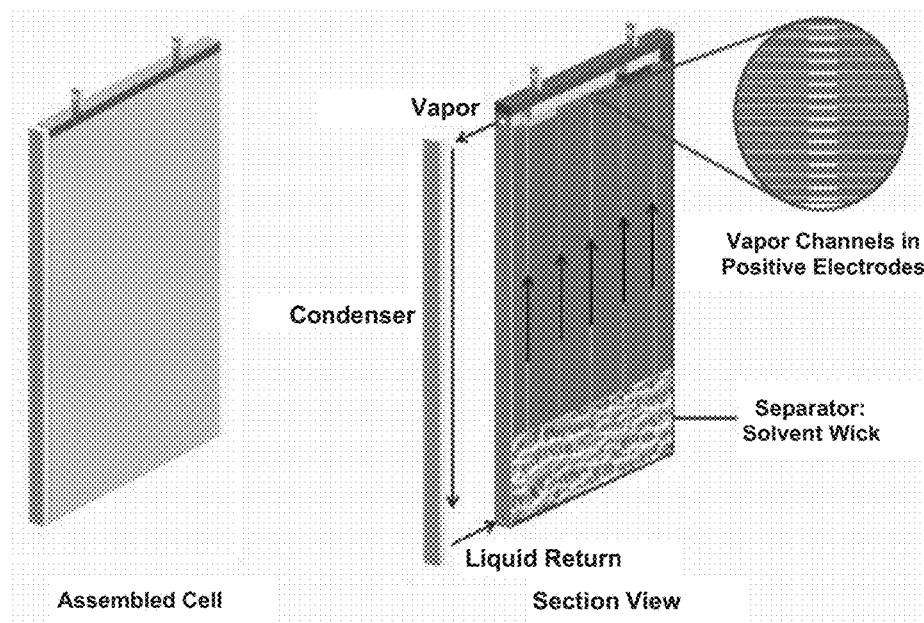
FIGS. 1A-1E. Proposed Internal Thermal Management System for Lithium-Ion Battery using a Volatile Co-Solvent in Electrolyte (a); Proposed Internal TMS in 18650 Cell (b); Representative Vapor Generation Channel Created in a Positive Electrode (c); Embodiment 1 of Proposed Internal TMS with External Liquid Cooled Condenser on Edge Face of LIB Cells (d); Embodiment 2 of Proposed Internal TMS with External Air Cooled Condenser on Large Face of LIB Cells (e).
Figure 1B:
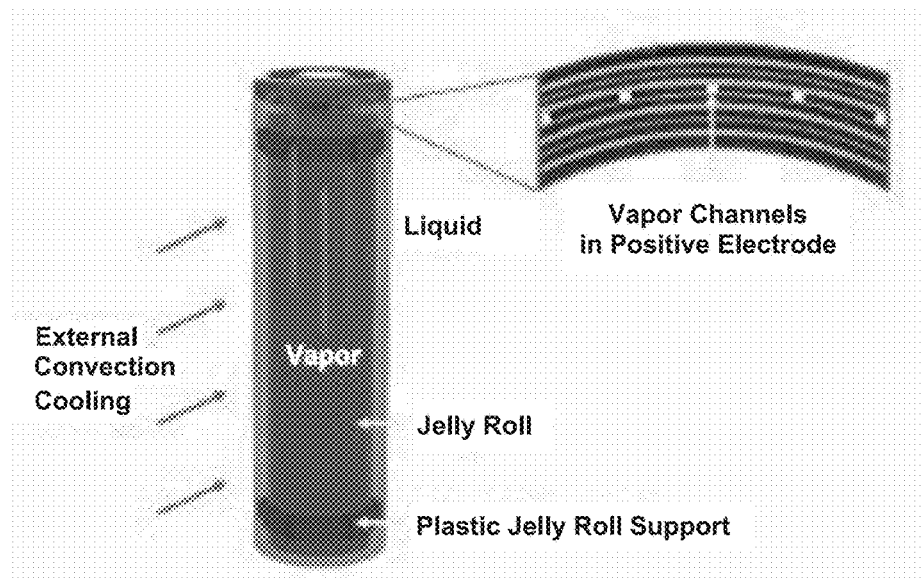

The internal TMS concept is also proposed for an 18650 cell architecture (FIG. 1*b*). For this architecture, the jelly roll is held in the center of the cell can with plastic jelly roll supports. The uniform separation created between the jelly roll and the 18650 steel provides an internal annular condenser for vapor generated within the channels of the positive electrode. External convection cooling is applied to the exterior casing of the 18650 steel can to provide the condensing power required.

Figure 1C:
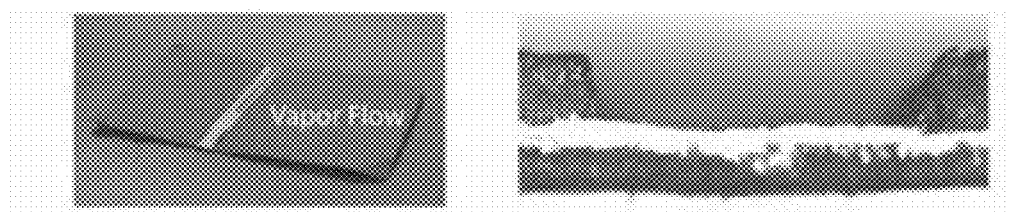

The cell modifications for the proposed internal TMS include the creation of evaporation channels and the integration of a condenser. The evaporator channels can be manufactured during the slurry coating process or completely removed after the electrode has been manufactured. In commercial cells, slurry-based positive electrode coatings uniformly cover the entire surface of the aluminum current collector and can range in thickness from 50-100 µm. To create these evaporation channels during electrode manufacturing, the slurry is spread uniformly on the aluminum current collector everywhere except for masked portions designated for channels. Once the solvent used for slurry suspension has been evaporated and the electrode is calendared to its final thickness, the channel masking material can be removed without disturbing the surrounding coating. Alternatively, manufactured positive electrodes with a uniform active material coating can be modified to contain the channels. The active material coating can simply be abrasively removed from the aluminum current collector using a metal spatula or similar device. This type of channel manufacturing process is not a production-worthy approach, but it suffices for validation of the concept. In both of the proposed manufacturing methods, the channels extend the entire vertical length of the electrode. FIG. 1*c* shows a representative vapor generation channel that was created after the electrode material was uniformly coated on the current collector.

Figure 1D:
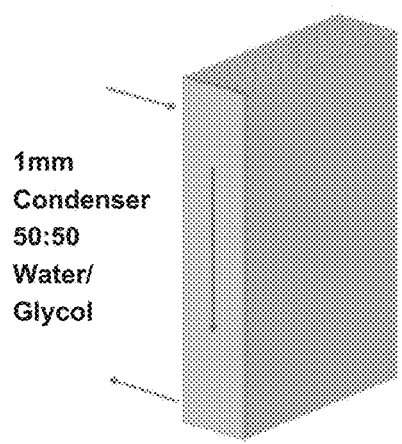
Figure 1E:
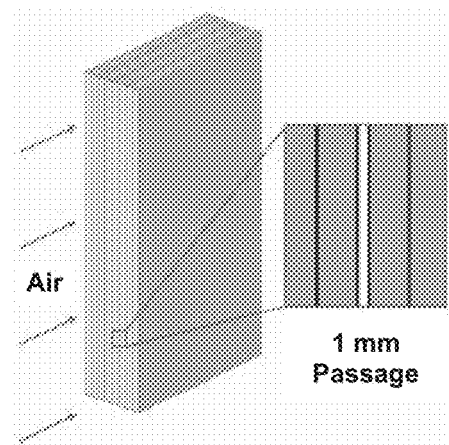

The proposed internal TMS has two embodiments. In FIG. 1*a*, the condenser for the proposed internal TMS is shown integrated into the thin edge of the LIB cell. In this particular embodiment, a liquid coolant can flow through a structure in thermal contact with the condenser on the edge of the battery. FIG. 1*d* shows a larger embodiment of the proposed internal TMS with a liquid cooled heat exchanger in contact with the thin edge of a group of cells. Water has an order of magnitude greater thermal conductivity and four times greater specific heat than air. This requires significantly less surface area for water to reject the same about of heat as air. A second embodiment of the proposed internal TMS is shown in FIG. 1*e*. In this system, 1 mm spacing is created between every two cells to create a flow path for cooling air flow. This style of cell spacing is used in the Chevrolet Volt LIB pack; however, in the Volt, aluminum cooling plates occupy the 1 mm spacing. The system impact of the two proposed embodiments of the internal TMS is compared to the Chevrolet Volt in Table 1.

TABLE 1

System Impact of Proposed Internal TMS Compared to Chevrolet Volt

| Calculated Quantity | Proposed Embodiment 1 | Proposed Embodiment 2 | Chevrolet Volt |
|---|---|---|---|
| Total Cell Volume (L) | 40.3 | 40.3 | 40.3 |
| Total Cell Mass (kg) | 107 | 107 | 108 |
| External Cooling System Volume (L) | 0.28 | 4.03 | 4.03 |
| External Cooling System Mass (kg) | 0.52 | 0.005 | 7.56 |
| Pack Gravimetric Capacity (Wh kg$^{-1}$) | 235 | 236 | 224 |
| Pack Volumetric Capacity (Wh L$^{-1}$) | 623 | 570 | 582 |

The MFE for the internal TMS described above requires specific thermal and electrochemical properties for the internal TMS to operate. The volatile co-solvent must have a low boiling point (<45° C. at 1 atm) to provide the isothermal heat absorption at temperatures below those associated with capacity degradation (>50° C.) and the onset of thermal runaway (>70° C.). The co-solvent must be miscible with the organic carbonate solvents that are commonplace to liquid lithium-ion electrolytes. The solvent mixture containing the volatile co-solvent must be capable of solvating a 1.0 M concentration of lithium salt to achieve a maximum ionic conductivity, and it should demonstrate a sufficient electrochemical stability window to enable reversible redox reactions at the anode and cathode interfaces of the cell. Finally, the MFE must also show cycling capability with lithium-ion insertion electrodes.

Hydrofluoroethers (HFE) are a candidate co-solvent for MFE because they can have a high vapor pressure, are aprotic, have a reasonably high dielectric constant (>50 to be comparable to cyclic carbonate co-solvents, or >5 for linear carbonate co-solvents), and are chemically compatible co-solvent with lithium-ion battery materials. There have been four HFE considered as co-solvents for lithium-ion electrolytes: HFE-7100, HFE-7200, HFE-7300, and HFE-7600. Another is HFE-7000 which has an ideal boiling point for the proposed internal TMS (34° C. at 1 atm) and a similar molecular structure (Table 2) to HFE-7100, which has been successfully demonstrated as a co-solvent in lithium-ion batteries.

TABLE 2

Molecular Structure of Volatile Co-Solvents for an MFE.

| Candidate Co-Solvent | Boiling Point at 1 atm (° C.) | Vapor Pressure at 25° C. (atm) | Absolute Viscosity at 25° C. (cP) | Dielectric Constant | Chemical Formula | Molecular Structure |
|---|---|---|---|---|---|---|
| HFE 7000 | 34 | 0.638 | 0.45 | 7.4 | $C_4H_3F_7O$ | |
| HFE 7100 | 60 | 0.609 | 0.58 | 7.4 | $C_5H_3F_9O$ | |
| FC-72 | 56 | 0.296 | 0.64 | 1.8 | $C_6F_{14}$ | |
| Perflenapent | 29.2 | 0.857 | 0.472 | 1.8 | $C_5F_{12}$ | |

The studies described in this disclosure characterize the boiling and non-boiling electrochemical performance of a candidate MFE containing HFE-7000 as the volatile co-solvent. Ethyl methyl carbonate (EMC) was chosen as a carbonate co-solvent in the electrolyte mixture (see Table 3). Lithium bis(trifluoromethane sulfonyl) imide (LiTFSI) salt was chosen for its high thermal stability, ionic conductivity, and solubility in electrolyte solutions not containing high dielectric constant solvents. Upon sufficient demonstration of compatibility in lithium-ion chemistry under normal operating conditions, the MFE was investigated in a custom electrolyte boiling facility to evaluate its thermal and electrochemical performance under continuous evaporation in a full cell architecture. The results show the feasibility of an internal TMS that utilizes the electrolyte as a heat transport medium.

TABLE 3

Organic Carbonate Solvents for LIB Liquid Electrolytes.

| Organic Carbonate Solvent | Boiling Point at 1 atm (° C.) | Melting Point (° C.) | Absolute Viscosity at 25° C. (cP) | Dielectric Constant | Chemical Formula | Molecular Structure |
|---|---|---|---|---|---|---|
| Dimethyl Carbonate (DMC) | 90.5 | 0.5 | 0.626 | 3.1 | $C_3H_6O_3$ | |
| Ethyl Methyl Carbonate (EMC) | 107.5 | 53.8 | 0.690 | 2.9 | $C_4H_8O_3$ | |
| Diethyl Carbonate (DEC) | 126.8 | −43 | 0.75 | 2.8 | $C_5H_{10}O_3$ | |
| Propylene Carbonate (PC) | 241.7 | −48.8 | 2.5 | 64.4 | $C_4H_6O_3$ | |
| Ethylene Carbonate (EC) | 248.2 | 36.4 | 1.86 (40° C.) | 90.5 | $C_3H_4O_3$ | |

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14*th* Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the end-points of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

The terms "inhibit", "inhibiting", and "inhibition" refer to the slowing, halting, or reversing the growth or progression of a disease, infection, condition, or group of cells. The inhibition can be greater than about 20%, 40%, 60%, 80%, 90%, 95%, or 99%, for example, compared to the growth or progression that occurs in the absence of the treatment or contacting.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

The term "ionic liquid" (or "molten salt") refers to a salt in the liquid (or molten state). In some contexts, the term refers to salts whose melting point is below 100° C., is near or below room temperature, or is near or below ambient temperature. A salt is a molecule having a cation and an anion forming an ionic bond, which is usually stronger than the Van der Waals forces between the molecules of ordinary liquids. Examples include compounds based on the 1-ethyl-3-methylimidazolium (EMIM) cation.

While ordinary liquids such as water are predominantly made of electrically neutral molecules, ionic liquids are largely made of ions. These substances are variously called liquid electrolytes, ionic melts, ionic fluids, fused salts, liquid salts, or ionic glasses.

Ionic liquids are described as having many potential applications at near room temperature and low temperatures. They can be used in catalysis, gas handling, pharmaceuticals, cellulose processing, nuclear fuel reprocessing, solar thermal energy, waste recycling, carbon, capture, and electric batteries. However, ionic liquids are often moderate to poor conductors of electricity, non-ionizing, highly viscous, and frequently exhibit low vapor pressure.

Room temperature ionic liquids consist of bulky and asymmetric organic cations such as, but not limited to, 1-alkyl-3-methylimidazolium, 1-alkylpyridinium, N-methyl-N-alkylpyrrolidinium and ammonium ions, and also phosphonium cations. A wide range of anions are employed, ranging from, but not limited to, simple halides, which generally suffer high melting points, to inorganic anions such as tetrafluoroborate and hexafluorophosphate, and to large organic anions like bistriflimide (synonymously referred to as, bis(trifluromethylsulfonyl)imide, or TFSI), triflate or tosylate. There are also many potential uses of ionic liquids with simple non-halogenated organic anions such as formate, alkylsulfate, alkylphosphate or glycolate. When both the cation and anion are organic ions then combined they would be an organic ionic liquid that could be used as an electrolyte.

An electric battery is a device consisting of one or more electrochemical cells with external connections provided to power electrical devices such as flashlights, smartphones, and electric cars. The term "battery" is a common term to describe an electrochemical storage system. A "cell" is a basic electrochemical unit that contains the basic components, such as electrodes, separator, and electrolyte. A "battery" or "battery pack" is a collection of cells or cell assemblies which are ready for use, as it contains an appropriate housing, electrical interconnections, and possibly electronics to control and protect the cells from failure. In this regard, the simplest "battery" is a single cell with perhaps a small electronic circuit for protection.

A lithium-ion battery or Li-ion battery is a type of rechargeable battery in which lithium ions move from the negative electrode to the positive electrode during discharge and back when charging. Li-ion batteries use an intercalated lithium compound as one electrode material, compared to the metallic lithium used in a non-rechargeable lithium battery. The electrolyte, which allows for ionic movement, and the two electrodes are the constituent components of a lithium-ion battery cell.

The term "perfuse" is referring to electrodes which have one or more channels or "flow channels" to allow the passage of a mixture, a liquid, a gas or a vapor. It is analogous to veins or arteries in tissue that circulate blood and nutrients.

The term "bubble point" refers to the temperature (at a given pressure) where the first bubble of vapor is formed when heating a liquid consisting of two or more components. Given that vapor will probably have a different composition than the liquid, the bubble point (along with the dew point) at different compositions are useful data when designing distillation type systems. For a single component, the bubble point and the dew point are the same and are referred to as the boiling point.

The term "vapor" refers to a substance diffused or suspended, for example, in the air, or in the vacant areas inside an electrochemical cell. In this disclosure, "vapor" may also be used interchangeably with the term "gas", which is one of the fundamental states of matter.

The term "phase-change" refers to any substance that changes from one state to another, with possible states being, for example, gas, liquid, and solid. Substances typically (but not always) phase change to the closest related state, such as liquid to gas, or gas to liquid. Each phase represents a quantity of energy being absorbed, or released. The more energy that a substance contains, the more likely that individual molecules or atoms will be able to resist intermolecular forces and spread apart. The thermal energy inside an electrochemical cell or battery can cause a liquid to phase-change to a gas or vapor. When the gas or vapor is cooled by, for example, a condenser or a condensing unit, the gas or vapor phase-changes to a liquid.

The term "condenser" refers to a device or unit used in systems involving heat transfer that condense a substance from its gaseous to its liquid state, by cooling it. In so doing, the latent heat is given up by the substance, and will transfer to the condenser coolant. Condensers are typically heat exchangers which have various designs and come in many sizes ranging from rather small (hand-held) to very large industrial-scale units used in plant processes. For example, a refrigerator uses a condenser to get rid of heat extracted from the interior of the unit to the outside air. Condensers are used in air conditioning, industrial chemical processes such as distillation, steam power plants and other heat-exchange systems, such as an electrochemical cell or battery that are described in this disclosure. Use of cooling, for example, water or surrounding air as the coolant is common in many condensers.

An electrolyte is a substance that produces an electrically conducting solution when dissolved in a polar solvent, such as water. The dissolved electrolyte separates into cations and anions, which preferably disperse uniformly through the solvent. When the electrolyte's composition comprises other additives, which enhance the function of the electrolyte, or gives the electrolyte other functional properties, then such an electrolyte is herein referred to as a "multi-functional electrolyte".

The term "fluorinated hydrocarbon" is used herein interchangeably with the terms fluorocarbons, or perfluorocarbons. A fluorinated hydrocarbon comprises carbon and fluorine. In this disclosure, some or all the hydrogens in a fluorinated hydrocarbon are replaced with fluorine. The fluorinated hydrocarbon may also further comprise other heteroatoms, such as, oxygen. Fluorocarbons and their derivatives are useful fluoropolymers, refrigerants, solvents, and anesthetics. Fluorinated hydrocarbons can be volatile, or easily evaporated at normal or near normal atmospheric temperatures, because they have a high vapor pressure, which give them properties that are useful as refrigerants.

When an electrolyte comprises a fluorinated hydrocarbon in the mixture, the partial pressure of the fluorinated hydrocarbon in the mixture contributes to the total pressure in the system. This type of electrolyte mixture is an example of a multi-functional electrolyte.

The term "thermal runaway" refers to situations where an increase in temperature changes the conditions in a way that causes a further increase in temperature, often leading to a destructive result. It is a kind of uncontrolled positive feedback. Thermal runaway describes a process which is accelerated by increased temperature, in turn releasing energy that further increases temperature. In chemistry (and chemical engineering), it is associated with strongly exothermic reactions that are accelerated by temperature rise. In electrical engineering, thermal runaway is typically associated with increased current flow and power dissipation, which can also trigger exothermic chemical reactions in some applications. For example, the onset of a thermal runaway in a lithium battery can occur between 80° C. to 100° C.

The term "safe limit" refers to a type of threshold limit value. In this disclosure, the composition of a multi-functional electrolyte would be formulated to regulate the internal temperature of an electrochemical cell or battery, and maintain an internal temperature that is sufficiently below the onset of thermal runaway. The design of the cell or battery would predicate the value of a maximum internal temperature that is considered safe.

The term "wicking structure" refers to a device that is designed to absorb or draw off a liquid by capillary action.

Organic compounds that decompose electrodes during charge form a solid layer called the solid electrolyte interphase (SEI), which is electrically insulating yet provides significant ionic conductivity. The interphase prevents further decomposition of the electrolyte after charging. For example, ethylene carbonate is decomposed at a relatively high voltage, 0.7 V vs. lithium, and forms a dense and stable interface. Organic compounds can be used as additives in an MFE to form and/or stabilize the SEI.

Embodiments of the Invention

This disclosure provides various embodiments of the inventive concept for a battery or an electrochemical cell. In a first embodiment, a method for thermal management of a battery is described. The method comprises regulating the temperature of a battery, wherein the battery comprises one or more electrodes perfused with one or more flow channels that are submerged in a multi-functional electrolyte (MFE), and the MFE comprises a mixture of a lithium salt, an organic electrolyte, and a volatile fluorinated hydrocarbon; wherein when the temperature of the battery exceeds a safe limit, the MFE heats to the bubble point of the MFE,
   a) the fluorinated hydrocarbon phase-changes to a vapor by absorbing thermal energy;
   b) the vapor is released to a condenser by passing through the flow channels in each perfused electrode;
   c) the fluorinated hydrocarbon vapor phase-changes to a liquid-phase by condensing in the condenser; and
   d) the condensed fluorinated hydrocarbon recycles by returning to the MFE;
wherein the battery temperature is regulated by a cycle of a) to d) of absorbing thermal energy, passing the vapors of hydrofluorocarbon through flow channels in the electrode, condensing the vapors to the liquid-phase, and returning the condensed fluorinated hydrocarbon to the MFE, thereby cooling the battery internally. This first embodiment can also apply to a single cell battery, or an electrochemical cell.

In various embodiments, the fluorinated hydrocarbon comprises HFE-7000, HFE-7100, HFE-7200, HFE-7300, HFE-7600, FC-72, perflenapent, R134a, a R400 refrigerant, or a R700 refrigerant. The fluorinated hydrocarbon has a boiling point less than about 90° C. in various other embodiments.

In other embodiments, the organic electrolyte comprises ethyl methyl carbonate, diethyl carbonate, dimethyl carbonate, ethylene carbonate, propylene carbonate, vinylene carbonate, fluoroethylene carbonate, or an organic ionic liquid.

Various embodiments of the ionic liquid comprise a composition having at least one cation selected from the group consisting essentially of ammonium, imidazolium, pyrrolidinium, pyridinium, phosphonium, and sulfonium, and at least one anion selected from the group consisting essentially of alkyl sulfate, tosylate, methansulfonate, bis(trifluoromethylsulfonyl)imide ([TFSI]), bis(pentafluoroethyl sulfonyl)imide ([BETI]), hexafluorophosphate, tetrafluoroborate, perchlorate, and halide. Preferred cations are N-methyl-N-propylpiperidinium, N,N-dimethyl-N-ethyl(2-methoxyethyl)ammonium, and N,N-diethyl-N-methyl(2-methoxyethyl)ammonium. Preferred anions are bis(trifluoromethylsulfonyl)imide, bis(pentafluoroethyl sulfonyl)imide, and perchlorate.

Embodiments of ionic liquids include ethyldimethylpropylammonium bis(trifluoromethylsulfonyl)imide, N,N-diethyl-N-methyl (2-methoxyethylammonium bis(trifluormethylsulfonyl)imide, N,N-dimethyl-N-ethyl (2-methoxyethylammonium bis(trifluormethylsulfonyl)imide, 1-butyl-1-methylpyrrolidinium bis(trifluoromethylsulfonyl)imide, tributylmethylammonium methyl sulfate, trihexyltetradecylphosphonium bis(trifluoromethylsulfonyl)amide, 1-n-butyl-3-methylimidazolium bis(trifluoromethylsulfonyl)imide, 1,2,3-trimethylimidazolium methyl sulfate, triethylsulfonium bis(trifluoromethylsulfonyl)imide, and 1-butyl-1-methylpyrrolidinium dicyanamide.

In various other embodiments, the lithium salt comprises lithium hexafluorophosphate ($LiPF_6$), lithium hexafluoroarsenate ($LiAsF_6$), lithium bis(oxalate)borate ($LiB(C_2O_4)_2$), lithium triflate ($LiSO_3CF_3$), lithium bis(trifluromethylsulfonyl)imide (LiTFSI), lithium bis(pentafluroethylsulfonyl)imide (LiBETI), or lithium nonafluorobutylsulfonyl trifluoromethylsulfonyl imide (LiFBMS).

In other embodiments, the lithium salt can be any lithium salt. Lithium salts having substantial thermal stability and solubility in the ionic liquid are preferred. Non-limiting examples of preferred lithium salts comprise; lithium hexafluorophosphate, lithium chloride, lithium bromide, lithium hexafluoroarsenate, lithium perchlorate, lithium tetrafluoroborate, lithium bis(trifluoromethylsulfonyl)imide, lithium tris(trifluoromethylsulfonyl)methide, and lithium bis(oxalato) borate. The lithium salt concentration ranges from about 0.05M to about 5 M (based on the molar concentration of the lithium salt), or lithium salt concentrations ranges from about 0.1 M to about 2.5 M. In yet other embodiments, the concentration of the lithium salt ranges from about 0.1 molar to about 2 molar, about 0.5 to about 1.5 molar, about 0.1 molal to about 2 molal, or about 0.5 molal to about 1.5 molal.

In additional embodiments, each electrode that is perfused with one or more flow channels comprises the positive electrode, or the negative electrode. In various embodiments, the flow channels have a cross-sectional area defined by a first dimension in the range of about 10 μm to about 200 μm, about 10 μm to about 100 μm, or about 10 μm to about 50 µm, and a second dimension in the range of about 10 µm to about 10 mm, about 10 µm to about 5 mm, about 10 µm to about 1 mm, about 10 µm to about 500 µm, or about 10 µm to about 250 µm.

In any one of the embodiments, the safe limit of the battery is below a temperature of about 40° C., about 50° C., about 60° C., about 70° C., or about 80° C. In other embodiments, internal cooling of the battery inhibits the temperature of the battery exceeding about 50° C., about 60° C., about 70° C., about 80° C., or about 90° C., and avoiding a thermal runaway.

In additional embodiments, the MFE comprises a lithium organo-imide salt dissolved in about equal volumes of an organic carbonate and a volatile fluorinated hydrocarbon to form a homogeneous liquid solution of the MFE. In other embodiments, the MFE comprises a homogeneous liquid solution of a lithium organo-imide salt and an organic carbonate, and the homogeneous liquid solution is in contact with a volatile fluorinated hydrocarbon.

In any one of the embodiments, the battery comprises one or more electrochemical cells. In other various embodiments, the electrochemical cell architecture comprises lithium iron phosphate ($LiFePO_4$), lithium nickel cobalt aluminum oxide ($LiNiCoAlO_2$), lithium manganese oxide ($LiMn_2O_4$, or $Li_2MnO_3$), lithium nickel manganese cobalt oxide ($LiNiMnCoO_2$), lithium cobalt oxide ($LiCoO_2$), copper antimony ($Cu_2Sb$), lithiated graphite ($LiC_6$), lithium titanate ($Li_2TiO_3$, or $Li_4Ti_5O_{12}$), or lithium sulfur ($Li_2S$).

In any one of the embodiments, a composition of the of the multi-functional electrolyte (MFE) comprises: a fluorinated hydrocarbon and an electrolyte mixture in a ratio of about 1:1, 1:2, 1:3, 1:4, 1:5, 1:6, 1:7, 1:8, 1:9, 1:10, 1:20, 1:50, or 1:10; a lithium salt in the mixture in a concentration of about 0.1 molar to about 2 molar, about 0.5 to about 1.5 molar, about 0.1 molal to about 2 molal, or about 0.5 molal to about 1.5 molal; and an optional solid electrolyte interphase (SEI) stabilizer; wherein the SEI stabilizer comprises lithium hexafluorophosphate ($LiPF_6$), the fluorinated hydrocarbon comprises HFE-7000, HFE-7100, HFE-7200, HFE-7300, HFE-7600, FC-72, perflenapent, R134a, a R400 refrigerant, or a R700 refrigerant, the organic electrolyte comprises ethyl methyl carbonate, diethyl carbonate, dimethyl carbonate, ethylene carbonate, propylene carbonate, vinylene carbonate, fluoroethylene carbonate, or an organic ionic liquid, and the lithium salt comprises lithium hexafluorophosphate ($LiPF_6$), lithium hexafluoroarsenate ($LiAsF_6$), lithium bis(oxalate)borate ($LiB(C_2O_4)_2$), lithium triflate ($LiSO_3CF_3$), lithium bis(trifluromethylsulfonyl)imide (LiTFSI), lithium bis(pentafluroethylsulfonyl)imide (LiBETI), or lithium nonafluorobutylsulfonyl trifluoromethylsulfonyl imide (LiFBMS).

In a second embodiment, an electrochemical cell with internal thermal management comprises: an electrode perfused with one or more flow channels that are submerged in a multi-functional electrolyte (MFE), and the MFE comprises a mixture of a lithium salt, an organic electrolyte, and a volatile fluorinated hydrocarbon; wherein when the temperature of the battery exceeds a safe limit, the MFE heats to the bubble point of the MFE,
 a) the fluorinated hydrocarbon phase-changes to a vapor by absorbing thermal energy;
 b) the vapor is released to a condenser by passing through the flow channels in the perfused electrode;
 c) the fluorinated hydrocarbon vapor phase-changes to a liquid-phase by condensing in the condenser; and
 d) the condensed fluorinated hydrocarbon recycles by returning to the MFE;

wherein the battery temperature is regulated by a cycle of a) to d) of absorbing thermal energy, passing the vapors of hydrofluorocarbon through flow channels in the electrode, condensing the vapors to the liquid-phase, and returning the condensed fluorinated hydrocarbon to the MFE, thereby cooling the electrochemical cell internally. In additional embodiments, the MFE comprises a lithium organo-imide salt dissolved in about equal volumes of an organic carbonate and a volatile fluorinated hydrocarbon to form a homogeneous liquid solution of the MFE.

In various embodiments, the flow channels have a volume of about 1 percent to about 20 percent, about 1 percent to about 10 percent, or about 1 percent to about 5 percent of the volume of the electrodes. In other embodiments, the flow channels have an aspect ratio of about 1:1 to about 100:1, about 1:1 to about 50:1, or about 1:1 to about 10:1. In other embodiments, the flow channels have a radius of about 10 µm to about 10 mm, about 10 µm to about 5 mm, about 10 µm to about 1 mm, about 10 µm to about 500 µm, about 10 µm to about 100 µm, or about 10 µm to about 50 µm. In additional embodiments, the condenser conductively transfers heat to the outer surface of the cell.

In any one of the embodiments, the battery comprises one or more electrochemical cells. In various embodiments, operation of the battery results in heat formation, wherein a continuous cycle of a) to d) of absorbing thermal energy, passing the vapors of hydrofluorocarbon through flow channels in the electrode, condensing the vapors to the liquid-phase, and returning the condensed fluorinated hydrocarbon to the MFE, cools the battery internally by absorbing thermal energy from a charging or a discharging electrode. In any of the embodiments heat formation occurs during normal operation of the electrochemical cell or battery, wherein normal operation includes changing and discharging of the electrodes, and a continuous cycle of steps a) to d) to cool the electrochemical cell or battery.

In a third embodiment, an internally refrigerated electrochemical cell comprises: an electrode perfused with one or more flow channels; a liquid wicking structure embedded within at least one flow channel; and an inert refrigerant that permeates through the wicking structure, and is miscible, partially miscible, or non-miscible with an electrolyte in an electrochemical cell; wherein when the temperature of the battery exceeds a safe limit,
 a) a refrigerant within the wicking structure phase-changes to a vapor by absorbing thermal energy;
 b) the vapor is released to a condenser by passing through the flow channels in the perfused electrode;
 c) the refrigerant vapor phase-changes to a liquid-phase by condensing in the condenser; and
 d) the condensed refrigerant recycles by returning to the flow channels by the wicking structures;

wherein the electrochemical cell temperature is regulated by a cycle of a) to d) of absorbing thermal energy, passing the vapors of refrigerant through flow channels in the electrode, condensing the vapors to the liquid-phase, and returning the condensed refrigerant to the flow channels, thereby cooling the electrochemical cell internally. In additional embodiments, the wicking structure comprises an etched channel, a machined channel, a sintered metal powder, a wire mesh, a ceramic, a polymer, or a glass.

Electrochemical Performance

Part I of this disclosure demonstrates the non-boiling electrochemical performance of the MFE (named E1). It was shown that E1 had an improved electrochemical stability window over a baseline carbonate-only electrolyte (1.0 M $LiPF_6$ in 3:7 EC/DEC by wt. %) as measured on a glassy carbon electrode. E1 was used in half and full cells with the following active materials: lithium iron phosphate (LiFePO$_4$, LFP), lithium titanate oxide (Li$_4$Ti$_5$O$_{12}$, LTO), and copper antimonide (Cu$_2$Sb). Cu$_2$Sb is an intermetallic electrode that offers an alternative to traditional graphite negative electrodes. Binary lithium-metal electrodes have attracted attention due to very high theoretical gravimetric and volumetric capacities and comparable operating potential range of 0-1 V vs. Li/Li$^+$ when compared to graphite. However, these binary metal systems experience a significant volume change (100-300%) during the lithium insertion and extraction process, which limits using such electrodes due to pulverization. These electrodes can also be modified to include an electrochemically inactive metal that limits the volume expansion of the electrode at the expense of the energy density. Cu$_2$Sb is one such electrode material offering a theoretical capacity of 323 mAh g$^{-1}$ and a high reversible cycling capacity up to 90% of the theoretical between 0-1.2 V vs. Li/Li$^+$. More importantly, the full conversion of Cu$^2$Sb to Li$^3$Sb only requires a 42% volume expansion. The MFE mixture does not contain SEI stabilizing additives proven for graphite anodes (i.e. EC and LiPF$_6$), therefore Cu$_2$Sb is selected for initial investigations. Although it was not possible to control the exact Cu$^2$Sb lithiation potential in the LFP/Cu$_2$Sb cell, the potential ideally was not less than 0.5 V vs. Li/Li$^+$ to limit solvent reduction and complete conversion of Cu$_2$Sb to Li$_3$Sb. This afforded a preliminary investigation of the coupled boiling and electrochemical performance of the MFE without substantial SEI formation and minimal capacity fade in the electrodes. The electrochemical performance of the MFE can be evaluated with graphite negative electrodes to provide direct comparison to state-of-the-art LIBs.

Galvanostatic cycling studies at a 0.5 C rate showed that despite having a lower ionic conductivity (2.309 mS cm$^{-1}$ for E1, 7.258 mS cm$^{-1}$ for baseline), the E1-containing cells had comparable cycling capacity to the baseline electrolyte in all cell combinations except for LFP half cells. It was believed that the aluminum corrosion reaction associated with the LiTFSI salt caused the significant capacity fade observed in the E1-containing LFP half cells. Several solutions to curb the aluminum corrosion reaction are possible, either by adding 1% by electrolyte weight (0.1 M) LiPF$_6$ or 0.26 M of LiBOB. Impedance spectroscopy showed that the cell and charge-transfer resistances were greater for the E1 cells in most instances due to the E1's lower ionic conductivity and reduced ability to form a stable SEI at the anode and cathode interfaces. However, LTO and Cu$_2$Sb half cells containing E1 showed decreased impedance as cycle life increased, ultimately resulting in a lower impedance than the baseline cells after 20 cycles. Improvements based on Addition of SEI-stabilizing additives such as EC are possible.

Both LFP/LTO and LFP/Cu$_2$Sb cells were created to evaluate the electrochemical performance of E1 in a full cell architecture. Although LFP/LTO cells showed significant capacity fade for both E1 and the baseline electrolytes, LFP/Cu$_2$Sb cells showed much more stable cycling performance over the 20 observed cycles and only a minor capacity fade. The aluminum corrosion reaction did not appear to be the source of capacity fade in the E1 LFP/Cu$_2$Sb cells, most likely due to the Cu$_2$Sb anode's limiting capacity. The potential of the LFP cathode never reached greater than 3.8 V vs. Li/Li$^+$, which is the potential at which the corrosion reaction between LiTFSI and the aluminum current collector becomes active. The slight capacity fade was believed to be due to excessive Li$_3$Sb formation in the anode during charge. A revised charging voltage limit is required to minimize the capacity fade associated with excess Li$_3$Sb formation in the Cu$_2$Sb anode.

Part II of this disclosure describes the performance of a full cell during simultaneous volatile co-solvent boiling and electrochemical cell cycling with a MFE which assesses the feasibility of the proposed internal TMS. Since the use of high vapor pressure electrolytes is counter-intuitive to conventional electrolyte design, physical observations of the boiling electrolyte were gathered specifically on vapor generation and suppression of lithium salt precipitation. Thermodynamic modeling of a binary mixture solvating a high concentration of lithium salt is a complicated process requiring many assumptions; therefore, visual observations of the vapor generation and measurements of the system temperature and pressure were made. Visual observations were also used to assess if lithium salt precipitation occurs while the MFE is boiling. Concurrently, the electrochemical performance was evaluated in a LFP/Cu$_2$Sb cell submerged in the MFE with galvanostatic cycling under non-boiling and boiling test conditions. The gathered results inform the future direction of the proposed internal TMS.

Non-Boiling Electrochemical Performance—Part I
Ionic Conductivity

The ionic conductivity of the MFE was measured at room temperature using a contact conductivity sensor. The measurement was compared to studies that have investigated other HFE fluids in LIB electrolytes with carbonate co-solvents at high mixing ratios similar to that used in this disclosure, and the results are summarized in Table 4. The salt LiBETI (LiN(SO$_2$C$_2$F$_5$)$_2$), is a similarly composed organic salt to LiTFSI (LiN(SO$_2$CF$_3$)$_2$), with a slightly larger anion. Consequently, the greater size of the anion and relatively high viscosity of HFE-7300 compared to other HFEs resulted in the lowest reported ionic conductivity of HFE-containing electrolytes. In contrast, the room temperature ionic conductivity of the MFE containing HFE-7000 is greater than all other reported electrolyte mixtures containing HFEs mixed at similar ratios with at least one carbonate co-solvent. The higher ionic conductivity of the MFE is attributed to the lower viscosity of HFE-7000 in comparison to previously investigated HFE fluids. When incorporating HFE-7100 into a 1 M LiBETI in EMC electrolyte, Arai (*J. Applied Electrochem.*, 32, 1071, 2002) observed an increase in ionic conductivity at 20% by volume HFE-7100, and only slightly lower ionic conductivity at 40% HFE-7100 than an electrolyte solely composed of EMC. The ionic conductivity increase was attributed to the lower viscosity of the HFE-7100 in comparison to EMC which enabled greater mobility of solvated ions when mixed together.

TABLE 4

Comparison of MFE Ionic Conductivity with other HFE-Containing Electrolytes.

| Study | Electrolyte Composition | Ionic Conductivity (mS cm$^{-1}$) | Viscosity of HFE Co-Solvent (cP) |
|---|---|---|---|
| This work | 1M LiTFSI in 1:1 HFE-7000/EMC by vol. | 2.31 | 0.45 |
| Arai | 1M LiTFSI in 8:2 HFE-7100/EMC by vol. | 0.97 | 0.58 |
| Naoi et al. | 1M LiBETI in 5:45:50 EC/DEC/HFE-7300 by vol. | 1 | 1.18 |

TABLE 4-continued

Comparison of MFE Ionic Conductivity with other HFE-Containing Electrolytes.

| Study | Electrolyte Composition | Ionic Conductivity (mS cm$^{-1}$) | Viscosity of HFE Co-Solvent (cP) |
|---|---|---|---|
| Nagasubramanian & Orendorff | 1M LiTFSI in 5:45:50 EC/DEC/HFE-7600 by vol. | ~2 | 1.65 |

(J. Arai, *J. Applied Electrochem.*, 32, 1071 (2002); Naoi, et al, *J. Electrochem. Soc.*, 156, A272 (2009); Nagasubramanian, et al, *J. Power Sources*, 196, 8604 (2011)).

Electrochemical Stability Window

Figure 3:
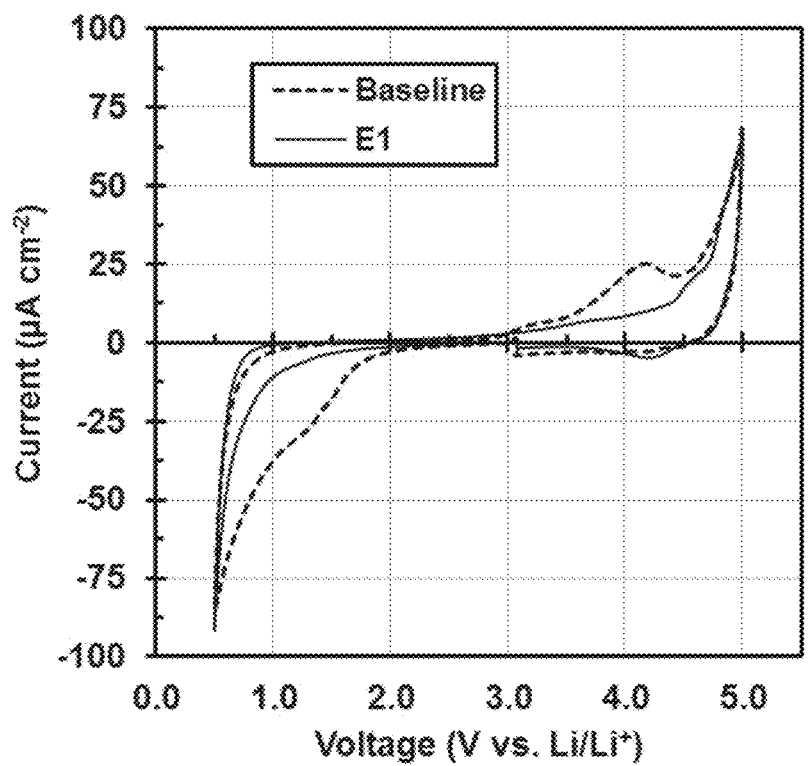
FIG. 3. Electrochemical Stability Window Measured with a GCE WE, Li metal CE/RE, 10 mV s-1 Scan Rate, 0.5 V and 5 V vs. Li/Li+ Switching Potentials.

The initial switching potentials selected (0.5 and 5 V vs. Li/Li$^+$) proved to be sufficient to capture the stability window of the electrolytes on a glassy carbon electrode (GCE). Both baseline and E1 electrolytes reach their oxidative and reductive limits prior to the scan reaching the switching potentials as indicated by the exponential growth in measured current seen (FIG. 3). As the potential is swept from the OCV towards the lower switching potential (0.5 V), it can clearly be seen that the baseline electrolyte begins to decompose on the GCE around 1.5 V vs. Li/Li$^+$. This observation is consistent with the first lithiation cycle of carbonaceous electrodes which includes significant EC decomposition to form a stable solid electrolyte interphase (SEI). The candidate electrolyte does not begin to show reductive decomposition until the potential is swept below 1.0 V vs Li/Li$^+$. The baseline electrolyte also showed increased oxidative decomposition at 4.2 V vs. Li/Li$^+$. Both electrolytes reach their oxidative limits by 5 V vs. Li/Li$^+$. E1 has improved stability compared to the baseline electrolyte, as less decomposition current is measured over the entire potential range until the oxidative and reductive limits are reached. This is a promising result as the baseline electrolyte is known to have a sufficient electrochemical stability with the lithium-ion chemistry due to its ability to form a stable SEI.

Half Cell Cycling

LTO, Cu$_2$Sb, and LFP half cells were created to evaluate the electrochemical performance of the baseline and candidate electrolytes with each active material. Cycling capacity and coulombic efficiency in FIGS. 4-7 and impedance data in FIG. 8 are an average of a minimum of three individual cells. EIS was used to determine the characteristic resistances of the cells with the two different electrolytes to assess the electrode-electrolyte impedance effects of HFE-7000. To date, these are the only impedance studies that investigated an HFE-containing electrolyte with any active material other than carbon, and the first with HFE-7000. Impedance data was collected at the upper voltage and lower voltage limits of the cell at 10 and 20 cycles. The impedance data were fit with the equivalent circuit model shown in FIG. 2. $R_\Omega$ represents the cell resistance: a series combination of resistances due to the electronic conductivity of the electrodes and SEI and the ionic conductivity of the electrolyte. $R_{ct}$ is the charge transfer resistance, which is a measure of the resistance to ion-transfer through the SEI layer into the active material. The CPE represents the imperfect capacitance of the electrochemical double layer on the surface of the active materials and required two parameters to define: $Q_{dl}$ and $\alpha$. The double-layer capacitance provides insight on the electrochemically active surface area of the active material in the electrode. $W_d$ is the infinite Warburg impedance associated with lithium-ion mass transfer into the working electrode. All Nyquist plots are of a single cell representative of the average impedance observed during testing.

Figure 4A:
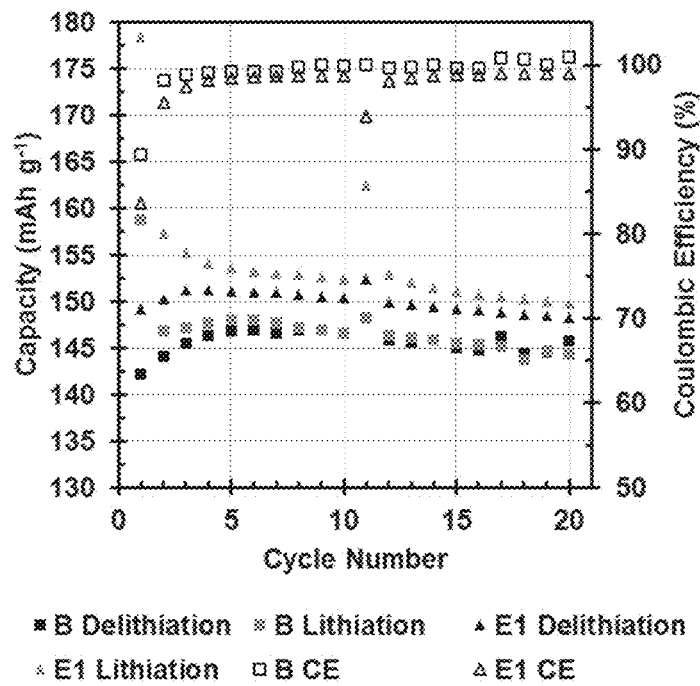
FIG. 4A-4C. LTO/Li Cell Data (a) Lithiation and Delithiation Capacity and Coulombic Efficiency, 386 $\mu A\ cm^{-2}$ at 25° C. (b) Nyquist Plot at 1 V vs. Li/Li$^+$ After 10 and 20 Cycles (c) Nyquist Plot at 2 V vs. Li/Li$^+$ After 10 and 20 Cycles.

FIGS. 4-6 present the half cell cycling data and Nyquist plots for LTO, Cu$_2$Sb, and LFP cells respectively. FIG. 4a shows the lithiation and delithiation capacity and the coulombic efficiency of the LTO half cells. The reported data is the average of three cells for each electrolyte. Before cycling, the E1 cells had an open circuit potential (OCP) on average of 2.9 V vs. Li/Li$^+$ while the B cells were 3.2 V vs. Li/Li$^+$. The E1 cells have a lower first cycle CE (83.6%) compared to B cells (89.4%). The low coulombic efficiency of the first cycle is expected for LTO, given inevitable impurities in the active material particles. Additionally, the E1 LTO cells require 3 cycles to achieve a CE of greater than 98%, as compared to 1 cycle for B cells. This indicates that the components of E1 are not as effective at initially passivating the LTO particle surface. However, for all 20 cycles the E1 cells had a greater charge-discharge capacity than the B cells. This suggests that E1 has improved surface wetting of the LTO particle surface over the baseline due to the lower surface tension of HFE-7000, possibly accounting for the greater charge-discharge capacity.

Figure 4B:
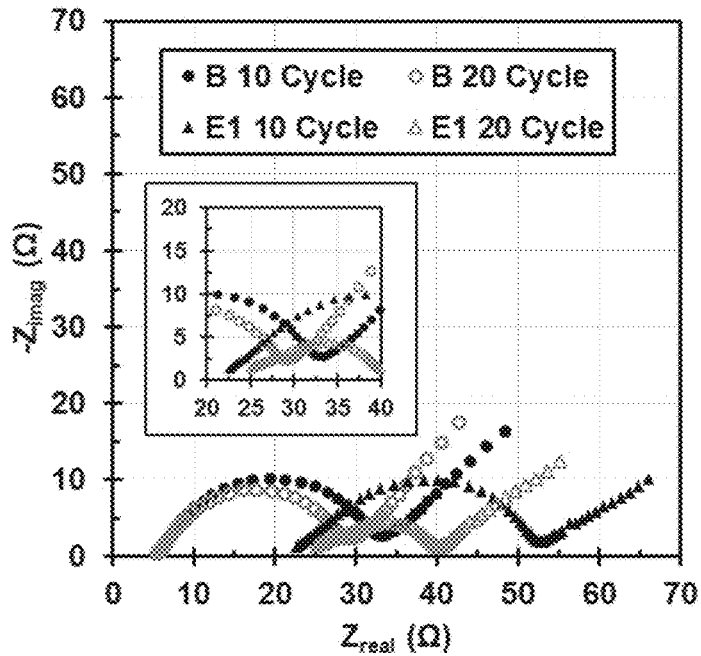
Figure 4C:
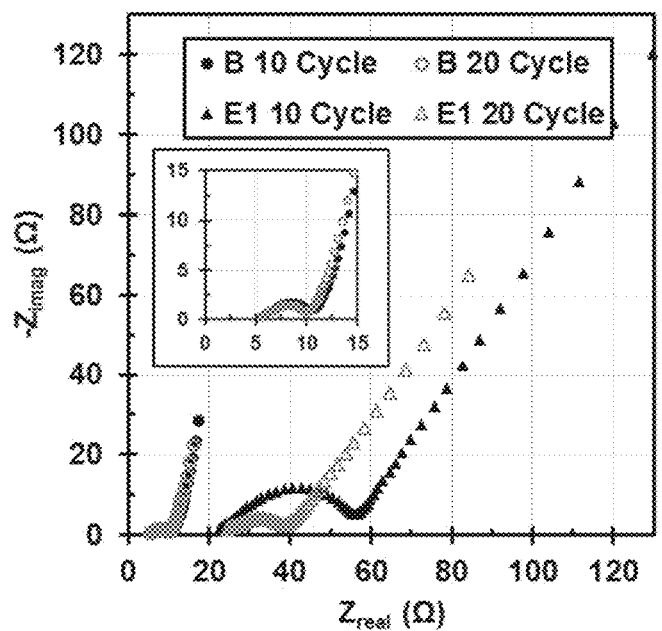

FIG. 4b and FIG. 4c show the measured impedance spectra for the LTO half cells at the lower and upper voltage limit, respectively. The resulting impedance spectra show only one characteristic time constant for the applied frequency range, which is expected for the complete lithiation and delithiation of the LTO active material. Detailed EIS studies with carbonate-only electrolytes have shown three characteristic time constants exist during the two-phase LTO lithiation-delithiation processes depending upon the state of lithiation. The EIS spectra obtained in this work were primarily evaluated for the cell resistance, charge-transfer resistance, and double layer capacitance.

Figure 8A:
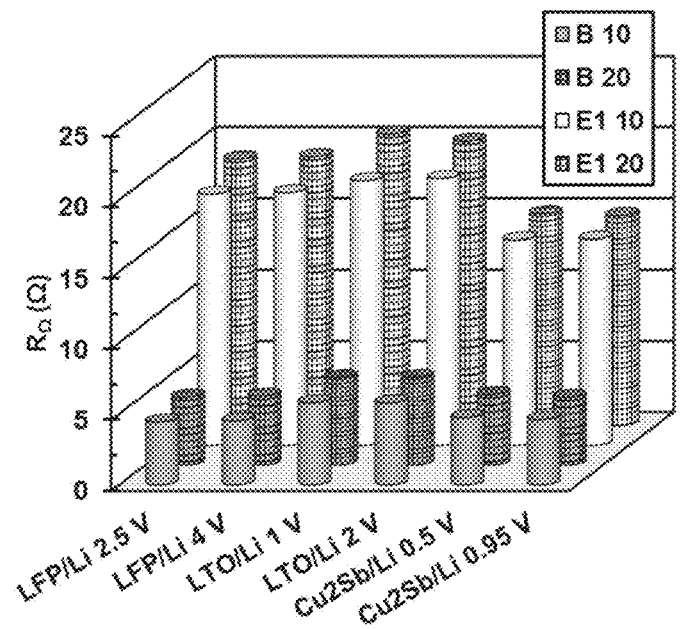
FIG. 8A-8C. Average EIS Fit Parameters for Half Cells after Cycle 10 and 20, All Potentials are vs. Li/Li$^-$ (a) $R_\Omega$ (b) $R_{ct}$ (c) $Q_{dl}$.
Figure 8B:
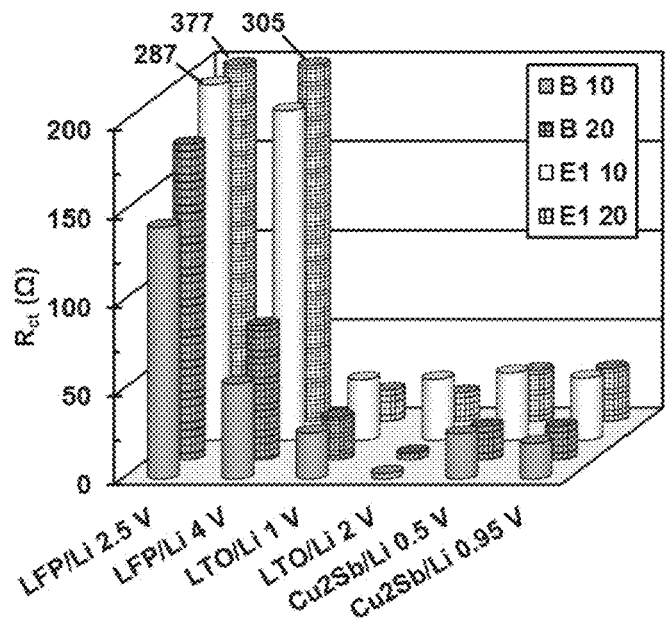
Figure 8C:
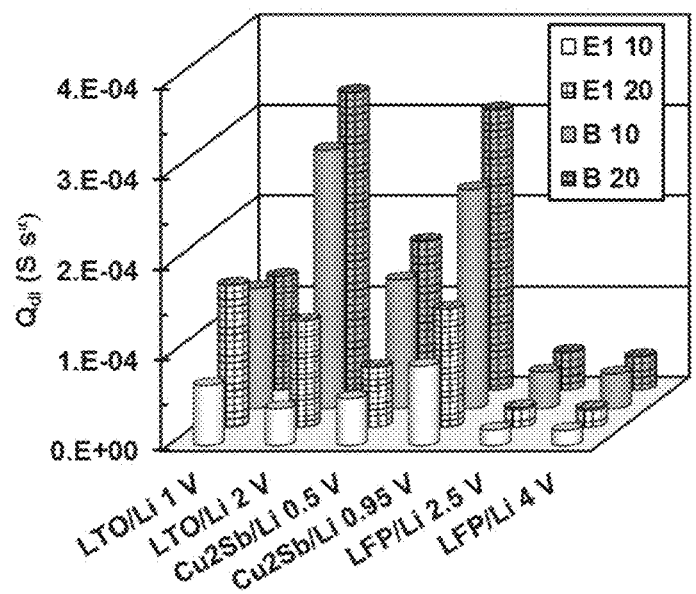

It can clearly be seen that the E1 LTO/Li cells have a higher cell resistance, $R_\Omega$ (FIG. 8a) which is attributed to the lower measured ionic conductivity compared to B. This trend was seen for every cell combination studied with E1. Interestingly, the impedance associated with the $R_{ct}$-CPE circuit of the E1 cells dropped significantly from 10 to 20 cycles (FIG. 8b and FIG. 8c). The charge transfer resistance ($R_{ct}$) reduced by nearly one half while the double-layer capacitance ($Q_{dl}$) doubled indicating an increase in the ionic conductivity of the SEI and an increase of available LTO particle active surface area. This result suggests that the initial LTO electrode-electrolyte passivation products formed during the first three cycles are not stable; however, with additional cycling a more optimal SEI forms.

Figure 7A:
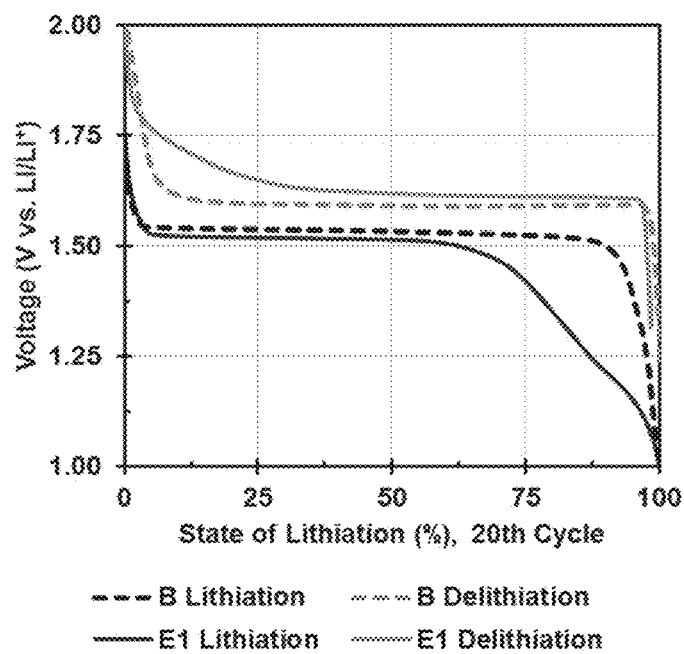
FIG. 7A-7C. Half Cell 20th Cycle Voltage vs. State of Lithiation (a) LTO/Li (b) $Cu_2$Sb/Li (c) LFP/Li.

FIG. 7a shows the 20$^{th}$ cycle LTO/Li cell voltage as a function of state of lithiation. The data was plotted by normalizing the capacity to the lithiation capacity measured on the 20$^{th}$ cycle for each cell. The E1 cell appears to deliver more than 25% of its capacity below the characteristic two-phase voltage plateau of LTO of 1.55 V vs. Li/Li$^+$. The two-phase reaction of spinel Li$_4$Ti$_5$O$_{12}$ to Li$_7$Ti$_5$O$_{12}$ rock salt occurs only at the 1.55 V plateau. It appears this change to the lithiation potential indicates the E1 electrolyte causes a modification to the LTO active material. It is thought that the decomposition reactions at the electrode interface produces a TiO$_2$ lithium intercalating structure. The single-phase lithiation of a bronze-phase TiO$_2$ structure has a very similar sloping voltage versus capacity at the potentials seen in the E1 half cell. The formation of the TiO$_2$-like intercalating compound occurs between cycles 11-20 as evidenced by the change in the $R_{ct}$ and CPE from 10 to 20 cycles. Based on the cycling capacity of the E1 LTO cells, the introduction of this alternate lithium-intercalating phase is not detrimental to cell's reversibility. Further cycling is required to fully evaluate the impact of E1 on LTO, and if the observed lithiation potential change is detrimental to long-term reversibility.

Figure 5A:
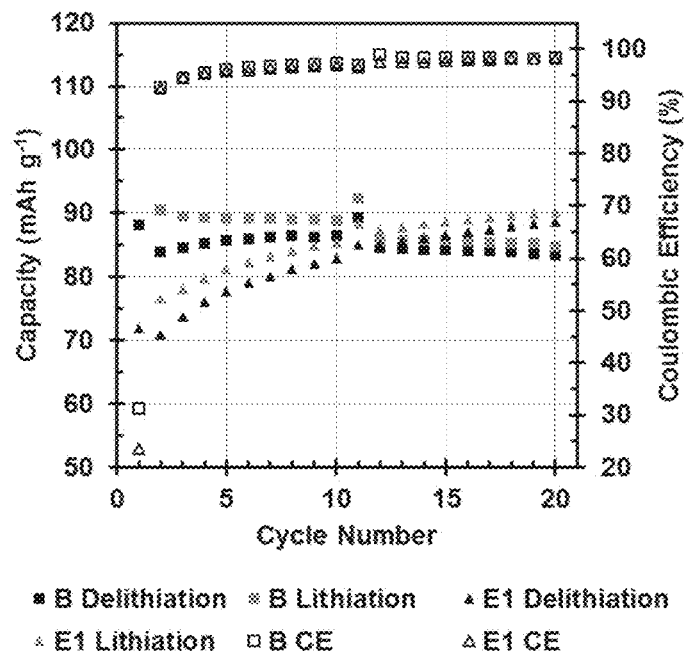
FIG. 5A-5C. $Cu_2$Sb/Li Cell Data (a) Lithiation and Delithiation Capacity and Coulombic Efficiency, 87.7 $\mu A\ cm^{-2}$ at 25° C. (b) Nyquist Plot at 0.5 V vs. Li/Li$^+$ After 10 and 20 Cycles (c) Nyquist Plot at 0.95 V vs. Li/Li$^+$ After 10 and 20 Cycles.

FIG. 5a shows the cycling and coulombic efficiency performance of $Cu_2Sb$/Li cells. Before cycling, the E1 cells had an average OCP of 2.8 V vs. Li/$Li^+$ while the B cells had an average of 3.3 V vs. Li/$Li^+$. For improved reversibility, the $Cu_2Sb$ electrode was only lithiated to 0.5 V vs Li/$Li^+$ to minimize the formation of $Li_3Sb$. $Li_3Sb$ formation and subsequent copper extrusion is the only capacity-producing reaction occurring at potentials below 0.5 V vs. Li/$Li^+$ for the intermetallic electrode. It has been shown that complete copper extrusion from the $Cu_2Sb$ structure causes severe capacity degradation as the $Li_3Sb$ can become electrically isolated from the electrode. The first lithiation cycle of the cells was performed at a fifth of the cycling current density. The E1 cells had a first cycle lithiation capacity of 312 mAh $g^{-1}$, while the B cells had a capacity of 280 mAh $g^{-1}$. High first lithiation capacity loss has been observed for $Cu_2Sb$ anodes manufactured from powders and is attributed to electrolyte reaction to oxides formed on the surface of the active material particles during manufacture. However, the direct electrodeposition of $Cu_2Sb$ onto the copper current collector does significantly reduce the amount of surface oxides formed, so the irreversible capacity loss can be primarily attributed to electrolyte decomposition for SEI formation. The first lithiation capacity difference can be attributed to the reduced passivation capability of E1 compared to B.

Figure 5B:
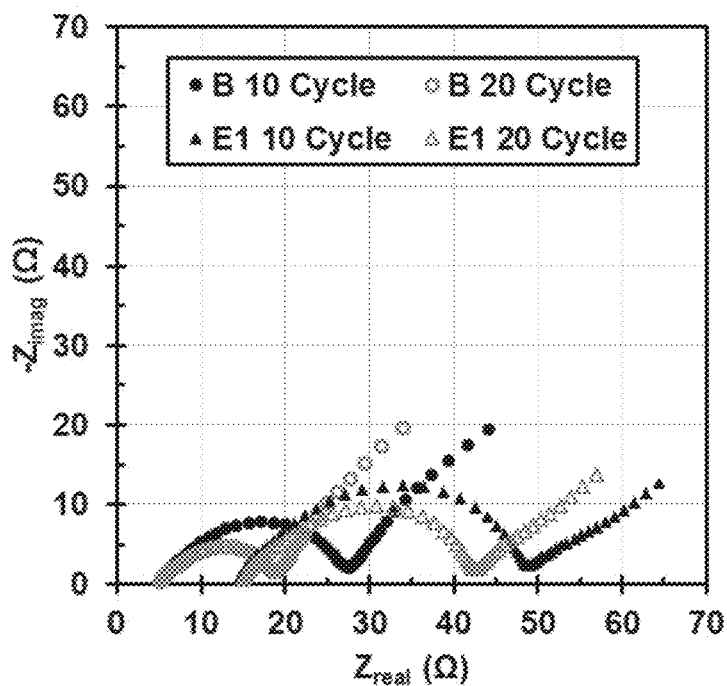
Figure 5C:
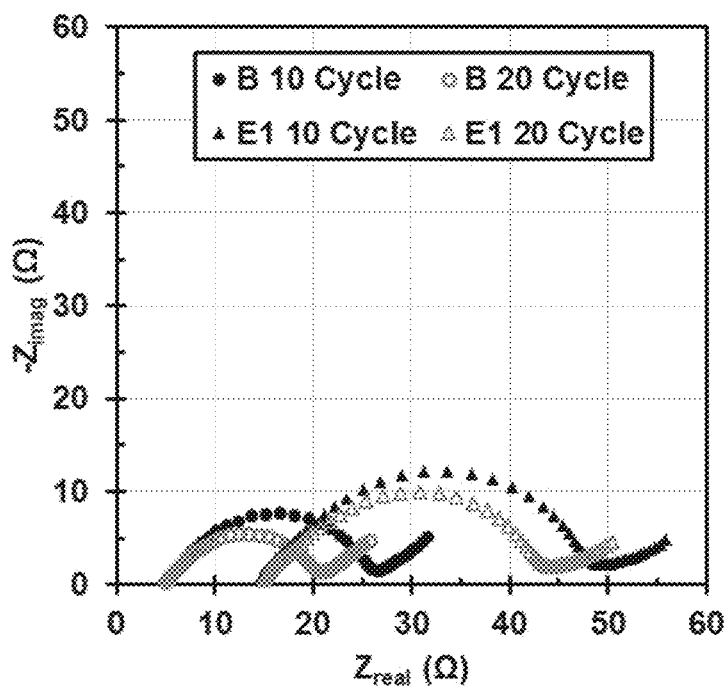
Figure 7B:
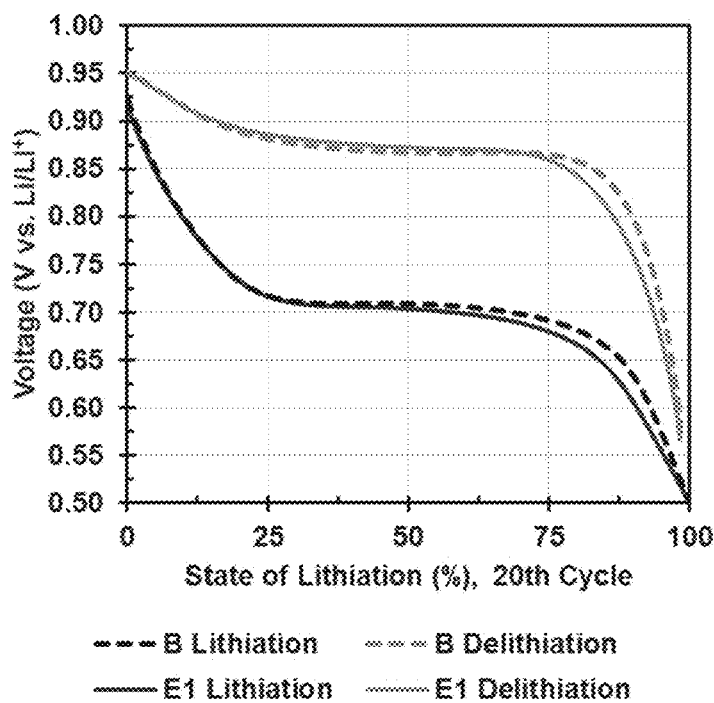
Figure 7C:
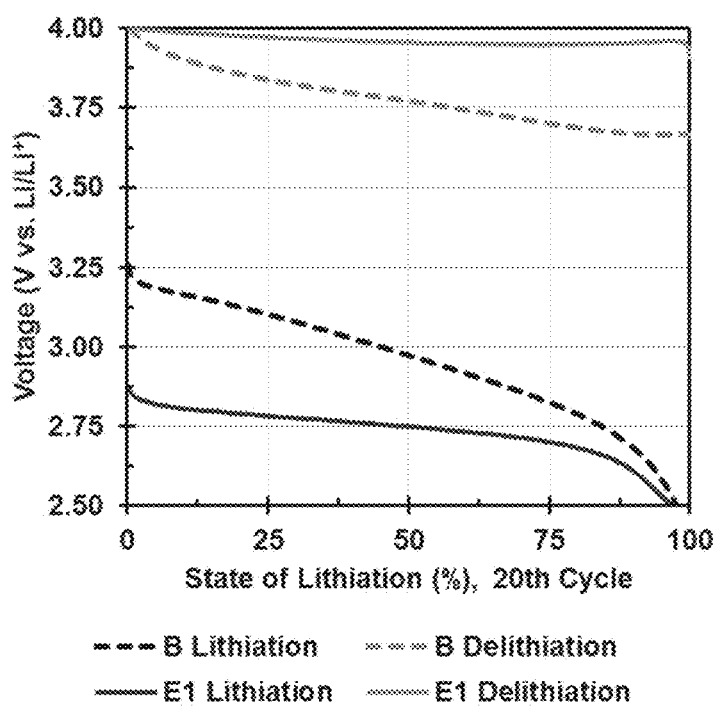

Both E1 and B $Cu_2Sb$/Li cells experienced increasing coulombic efficiency as cycle number increased. Moreover, the E1 cells saw a significant increase in the reversible capacity as cycle number increased: an approximately 19 mAh $g^{-1}$ increase from cycle 2 to 20. This can be attributed to the decreasing impedance of the cell as seen in FIG. 5b and FIG. 5c which enables lithium trapped during the first lithiation of the electrode to be accessed. FIG. 8b shows an approximate 20% decrease in $R_{ct}$ for E1 cells indicating the conductivity of the SEI improves. A similar decrease in $R_{ct}$ is observed for B cells; however, this does not result in improved cycling capacity as a slight capacity fade is observed throughout the 20 cycles. FIG. 7b shows the $20^{th}$ cycle voltage as a function of state of lithiation for the $Cu_2Sb$ cells. Both the E1 and B cells have very similar voltage profiles and overpotentials. This indicates identical utilization of the two-phase region of $Cu_2Sb$.

Figure 6A:
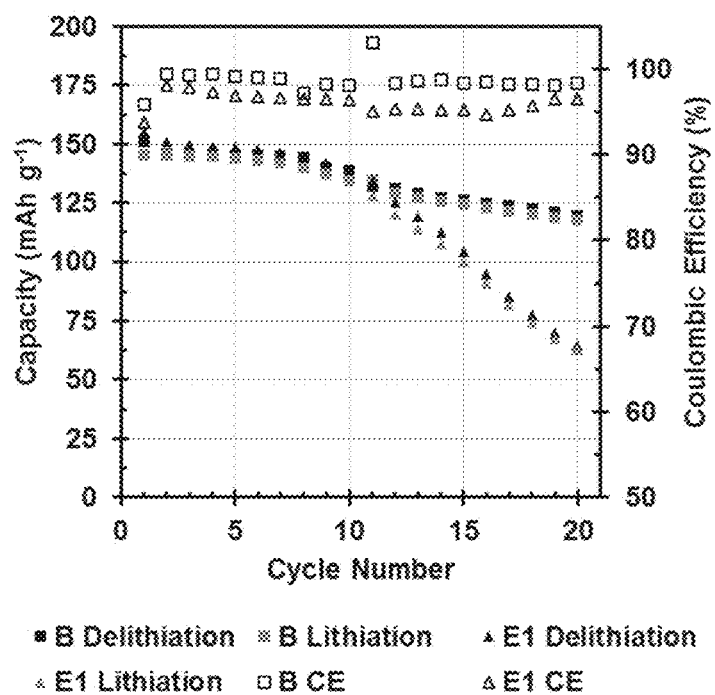
FIG. 6A-6C. LFP/Li Cell Data (a) Lithiation and Delithiation Capacity and Coulombic Efficiency, 386 $\mu A\ cm^{-2}$ at 25° C. (b) Nyquist Plot at 2.5 V vs. Li/Li$^+$ After 10 and 20 Cycles (c) Nyquist Plot at 4 V vs. Li/Li$^+$ After 10 and 20 Cycles.

FIG. 6a shows the cycling and coulombic efficiency performance of LFP/Li cells. LFP was selected as a cathode active material because of its relatively low redox potential (3.5 V vs. Li/$Li^+$) versus other lithium intercalating cathode chemistries. The choice of LFP precludes the need to form a substantial SEI because the oxidative limit of the electrolyte is nearly 1 V above the upper voltage limit of the LFP/Li cell (4 V vs. Li/$Li^+$). The lower voltage limit (2.5 V vs. Li/$Li^+$) of the LFP half cell is also much greater than the reduction limit of the electrolytes allowing both the E1 (94%) and B (96%) cells to have a much higher first cycle CE compared to LTO and $Cu_2Sb$ half cells. However, after approximately six cycles, the reversible capacity begins to fade for the B cells, and more dramatically for the E1 cells. The capacity fade seen in the B cells can possibly be attributed to two degradation mechanisms: trace water contamination in the cell and LFP active material particle cracking. The $PF_6^-$ anions in the B electrolyte readily react with any trace $H_2O$ to form HF which is capable of dissolving iron from the olivine structure of LFP, reducing the capacity of the cell.

Figure 6B:
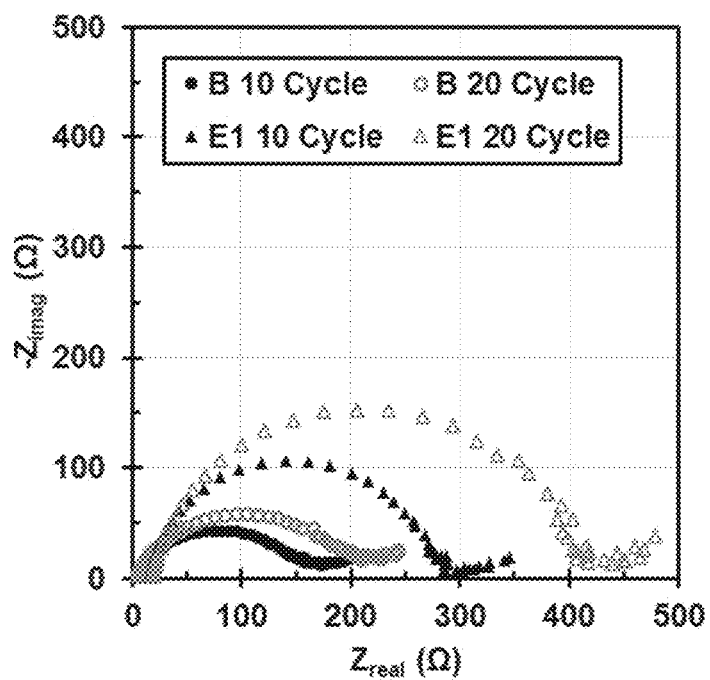
Figure 6C:
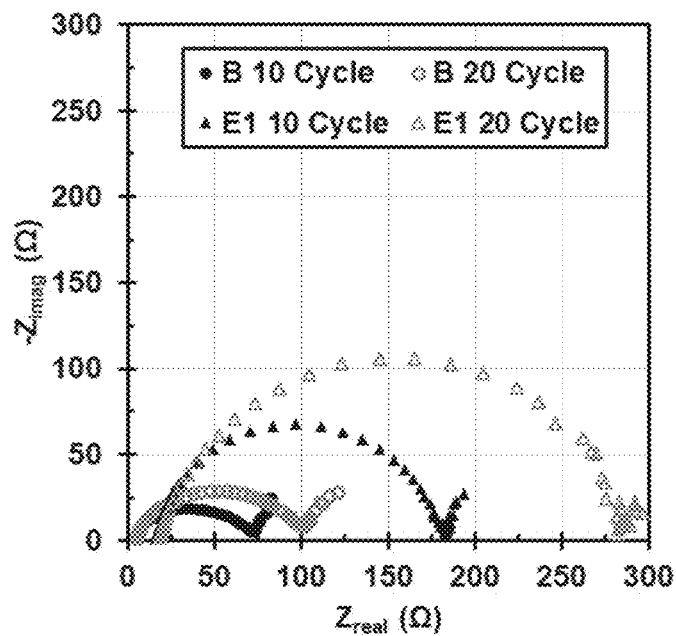

The capacity fade seen in the E1 cells is attributed to the interaction of the aluminum current collector and the LiTFSI salt. 1.0 M concentrations of LiTFSI has been shown to cause aluminum current collector corrosion at potentials above 3.8 V vs. Li/$Li^+$ in organic carbonate solvents. It was unclear if the upper voltage limit of 4 V vs. Li/$Li^+$ would cause aluminum corrosion in the E1 cells or if the fluorinated HFE-7000 co-solvent would be capable of providing aluminum passivation by reacting to form LiF. Based on the results, it is clear that HFE-7000 does not assist in aluminum current collector passivation as the cell impedance continues to grow over the 20 cycles of the cell. FIG. 6b and FIG. 6c show the dramatic growth in impedance from 10 to 20 cycles. Most notably, a 64% increase in $R_{ct}$ is observed at 4 V vs. Li/$Li^+$ for E1 cells from cycles 10 to 20 (FIG. 8b). This indicates that irreversible aluminum corrosion is occurring at this potential and the E1 mixture is not capable of passivating the surface of the aluminum, as the electrolyte continues to decompose. This effect is also very evident in FIG. 7c which shows the voltage versus state of lithiation for the $20^{th}$ cycle. The large voltage difference between the lithiation and delithiation curves for E1 indicates large cell resistances resulting from the aluminum corrosion and electrolyte decomposition. Several solutions have been identified for aluminum passivation in 1.0 M LiTFSI electrolytes. The addition of another lithium salt, either 1% by electrolyte weight (0.1 M) $LiPF_6$ or 0.26 M of LiBOB has proven to be sufficient for aluminum passivation. Further investigations will conclude if either of these solutions provide an acceptable solution for reversible cycling performance in E1-containing LFP/Li cells.

Full Cell Cycling

Figure 2:
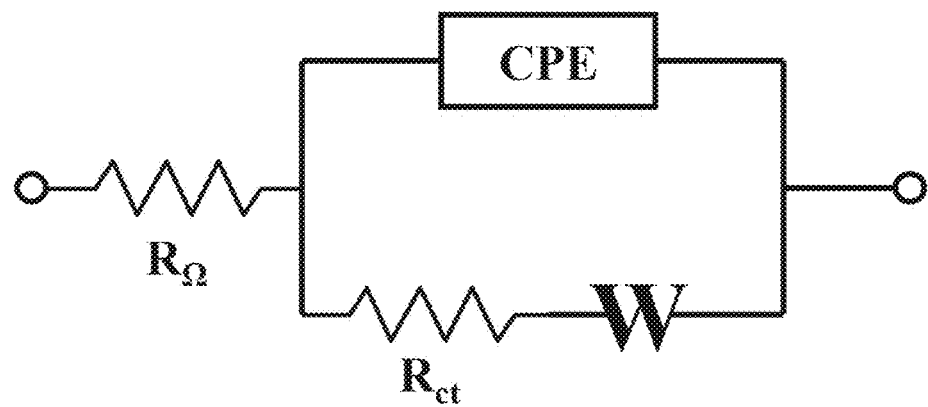
FIG. 2. Equivalent Circuit Model Used for Impedance Fitting.

After evaluating the performance of the electrolytes with half cell testing, full cells were constructed of the following combinations: LFP/$Cu_2Sb$ and LFP/LTO. In both architectures, the anode active material was the limiting capacity. The cycling voltage limits for the LFP/$Cu_2Sb$ full cells were determined from the half cell cycling voltage limits. The upper voltage limit of the full cell (3.5 V) was determined by subtracting the delithiated LFP cathode potential (4 V vs. Li/$Li^-$) from the lithiated potential of the $Cu_2Sb$ anode (0.5 V vs. Li/$Li^+$). The lower voltage limit assumed the LFP cathode potential would remain near 3.5 V vs. Li/$Li^+$ due to the limiting capacity of the $Cu_2Sb$ anode, whose potential once fully delithiated would quickly rise. 1.75 V vs. Li/$Li^+$ for the $Cu_2Sb$ anode was determined as a sufficient delithiated potential, which was used as the lower voltage limit of the LFP/$Cu_2Sb$ cell. The cycling voltage limits for the LFP/LTO full cells was determined by predicting the average potential of the cell to be approximately 2 V since LFP has a two-phase voltage plateau of 3.5 V vs. Li/$Li^+$ and LTO has a two-phase voltage plateau of 1.5 V vs. Li/$Li^+$. Because minimal capacity is delivered outside of the two-phase region for both active materials, the LFP/LTO voltage limits were extended by 0.5 V on either side of 2 V (i.e., 1.5 V to 2.5 V). The same equivalent circuit was used for impedance fitting as the half cells (FIG. 2).

Figure 9A:
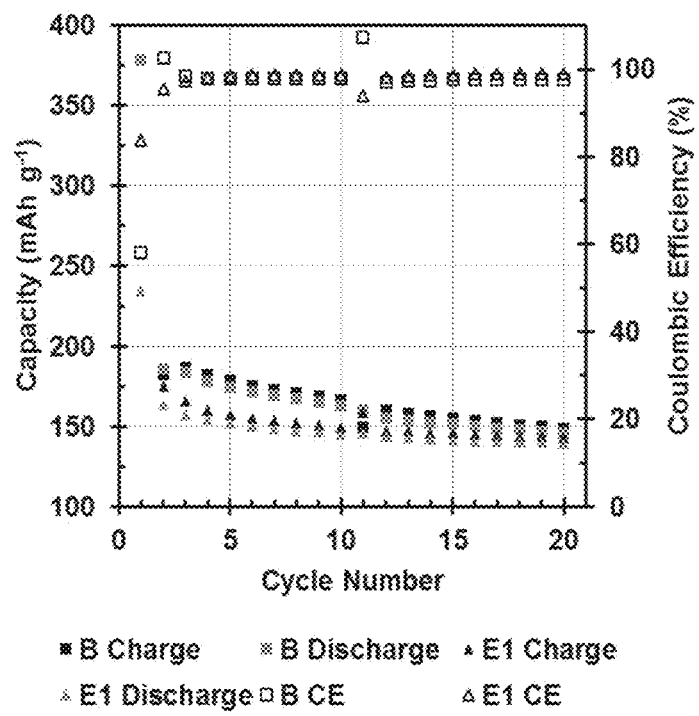
FIG. 9A-9C. LFP/$Cu_2$Sb Cell Data (a) Charge and Discharge Capacity and Coulombic Efficiency, 175 $\mu A\ cm^{-2}$ at 25° C. (b) Nyquist Plot at 1.75 V After 10 and 20 Cycles (c) Nyquist Plot at 3.5 V After 10 and 20 Cycles.

FIG. 9 and FIG. 10 present the full cell cycling data and Nyquist plots for LFP/$Cu_2Sb$ and LFP/LTO cells respectively. Average EIS fit parameters ($R_\Omega$, $R_{ct}$, and $Q_{dl}$) for both full cells are presented in FIG. 11. The cycling and coulombic efficiency performance of LFP/$Cu_2Sb$ full cells is shown in FIG. 9a. The first charge coulombic efficiency for the E1 cells (83%) was significantly higher than B cells (58%).

Throughout the 20 cycles, the E1 cells have a slightly greater coulombic efficiency suggesting that the E1 electrolyte offers improved cell reversibility. Both electrolytes showed some capacity fade over the 20 cycles. The reduction in capacity could be due to the sensitivity of the $Cu_2Sb$ anode on the cell voltage limits. If the potential of the $Cu_2Sb$ electrode becomes lower than 0.5 V vs. $Li/Li^+$ in the full cell architecture, copper will be extruded from the active material structure. As previously stated, this reduces the reversible capacity of the active material independent of the electrolyte used and could be the source of capacity fade. It is likely that the potential of the $Cu_2Sb$ anode was lower than ideal threshold of 0.5 V vs. $Li/Li^+$ since it was the limiting capacity electrode of the full cell. No optimization work has been performed on the voltage limits used for the cell to ensure minimal $Li_3Sb$ formation occurs in the $Cu_2Sb$ anode. Song et al. showed the sensitivity of the $Cu_2Sb$ anode to full cell voltage limits. The reversible capacity dramatically improved in a $LiNi_{0.8}Co_{0.15}Al_{0.05}O_2/Cu_2Sb$ cell with revised cell voltage limits to limit the $Cu_2Sb$ anode's potential to 0.65-1.4 V vs. $Li/Li^+$ as opposed to 0.1-1.2 V vs. $Li/Li^+$.

Figure 9B:
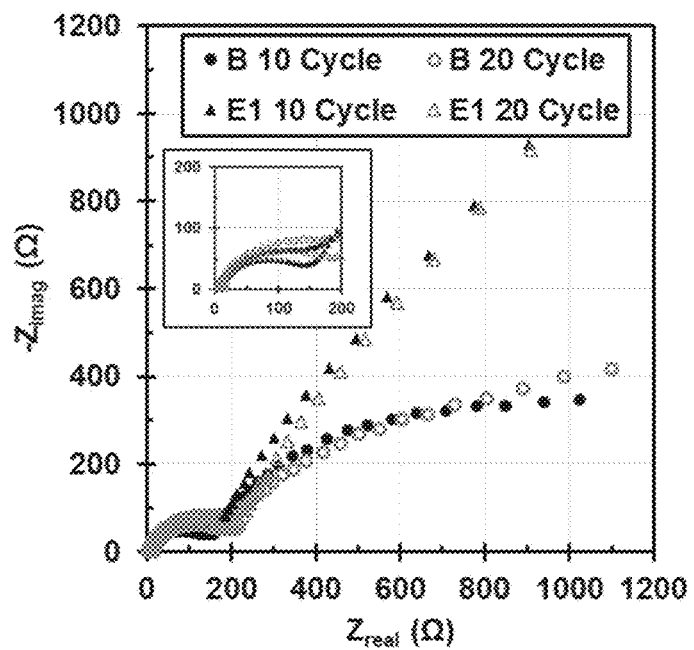
Figure 9C:
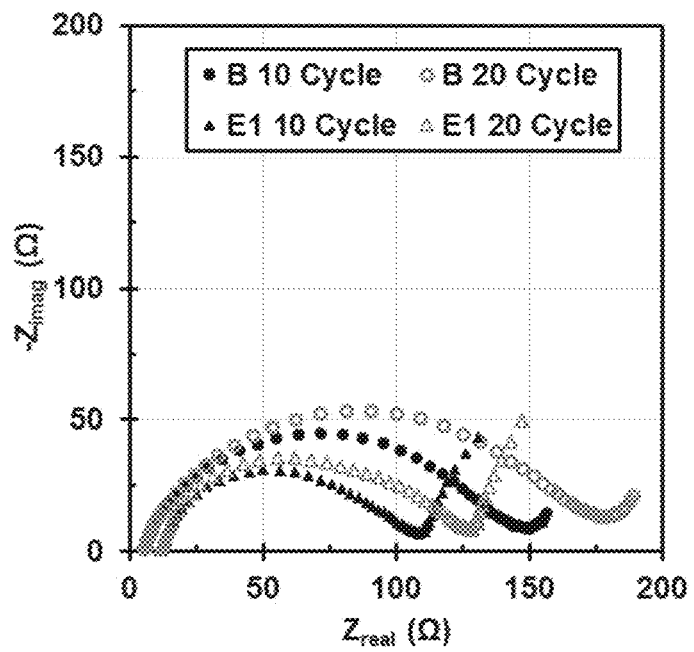
Figure 11A:
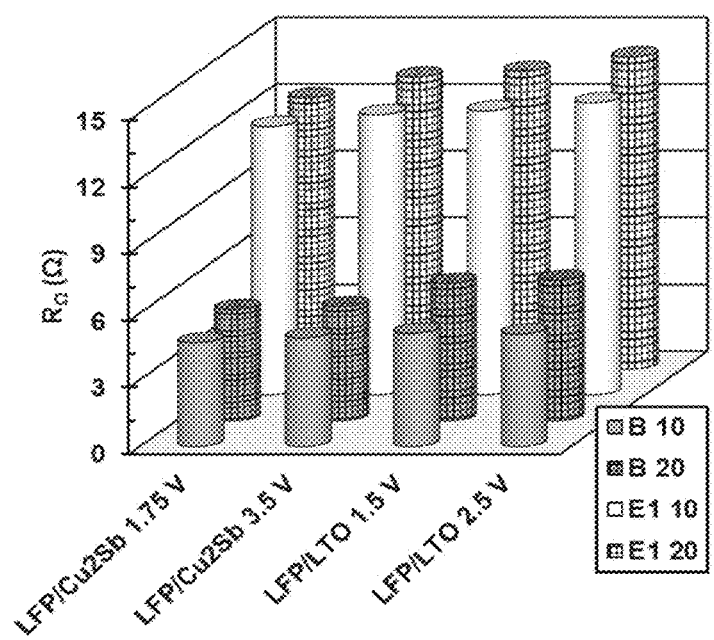
FIG. 11A-11C. Average EIS Fit Parameters for Full Cells after Cycle 10 and 20 (a) $R_\Omega$ (b) $R_{ct}$ (c) $Q_{dl}$.
Figure 11B:
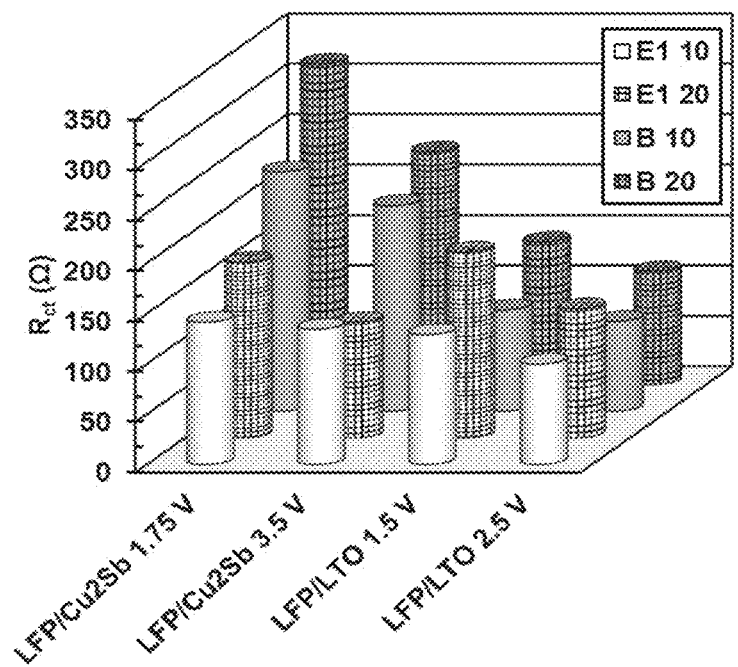
Figure 11C:
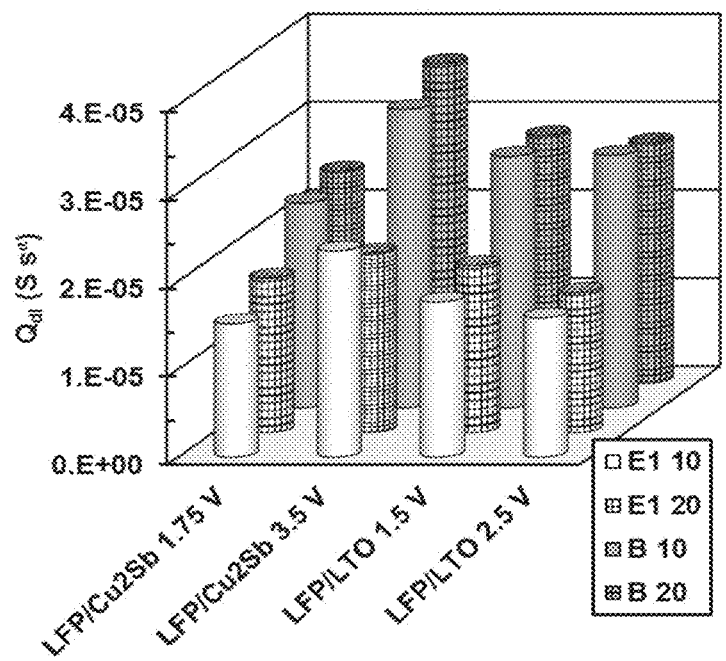

FIG. 9b and FIG. 9c show the impedance spectra of the $LFP/Cu_2Sb$ cell at the lower and upper voltage limits. The resulting EIS fit parameters are seen in FIG. 11. Interestingly, the charge transfer resistance of the E1 cells is nearly half of the B cells at 20 cycles (FIG. 11b). Moreover, the charge transfer resistance at the upper voltage limit of the $LFP/Cu_2Sb$ cell decreased as cycle number increased. This result indicates that more favorable charge transfer kinetics through the SEI are present in the E1 cells. More importantly, this result also shows that aluminum current collector corrosion on the LFP cathode is not present in the E1-containing full cells. The E1-containing LFP/Li half cells had a growing charge transfer resistance and severe capacity fade over the 20 cycles, but this is not the case for the full cells. This is attributed to the positive electrode of the full cells never reaching a potential greater than 3.8 V vs. $Li/Li^+$ to activate the aluminum corrosion reaction.

Figure 12A:
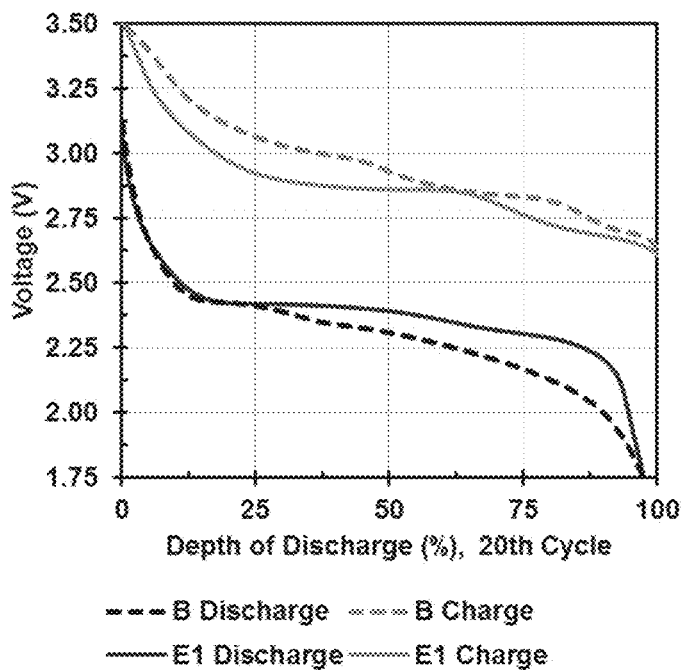
FIG. 12A-12B. Full Cell $20^{th}$ Cycle Voltage vs. Depth of Discharge (a) LFP/$Cu_2$Sb (b) LFP/LTO.

FIG. 12a shows the voltage of the $LFP/Cu_2Sb$ cells as a function of depth of discharge for the $20^{th}$ cycle. The plot was generated by normalizing the measured cell capacity to the total charge capacity of the $20^{th}$ cycle. It can clearly be seen that the E1 cells have a more narrow cycling voltage window. This result suggests that the lithium intercalation and de-intercalation kinetics in the active materials is improved for the E1 cells; a consistently lower overpotential is measured over the entire state of charge window compared to B cells. This is a promising result for the proposed E1 electrolyte mixture.

Figure 10A:
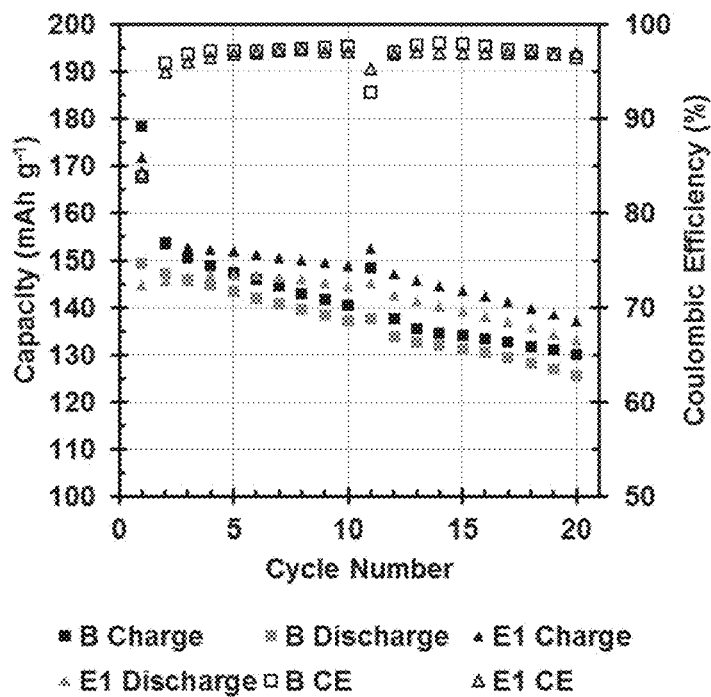
FIG. 10A-10C. LFP/LTO Cell Data (a) Charge and Discharge Capacity and Coulombic Efficiency, 291 $\mu A\ cm^{-2}$ at 25° C. (b) Nyquist Plot at 1.5 V After 10 and 20 Cycles (c) Nyquist Plot at 2.5 V After 10 and 20 Cycles.

FIG. 10a shows the cycling and coulombic efficiency performance of LFP/LTO full cells. Both the E1 and B cells have a first cycle coulombic efficiency of 84%. This value is much higher than the coulombic efficiency seen for the $LFP/Cu_2Sb$ cells. At the upper and lower voltage limits of the full cell, minimal active material particle passivation is required. Therefore, minimal capacity is lost due to lithium consumption in SEI decomposition products on the first cycle. However, over the course of the 20 cycles, significant capacity fade was observed for both E1 and B cells. The rate of capacity fade for both electrolytes is also very similar. This result suggests that despite the two different electrolytes, the same capacity fade mechanism is present in the two cell types. Moreover, the rate of capacity fade is similar to that observed with the B-containing LFP/Li half cells indicating the mechanism could possibly be LFP active material particle cracking.

Figure 10B:
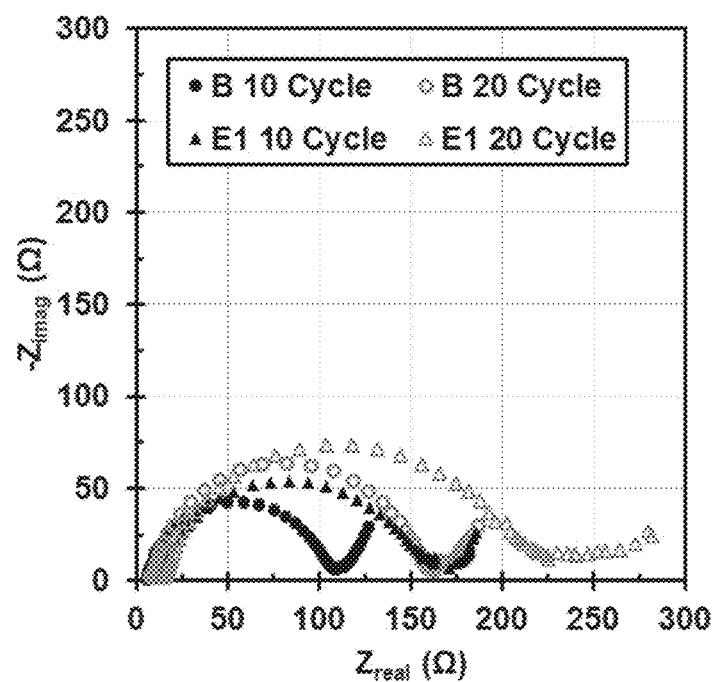
Figure 10C:
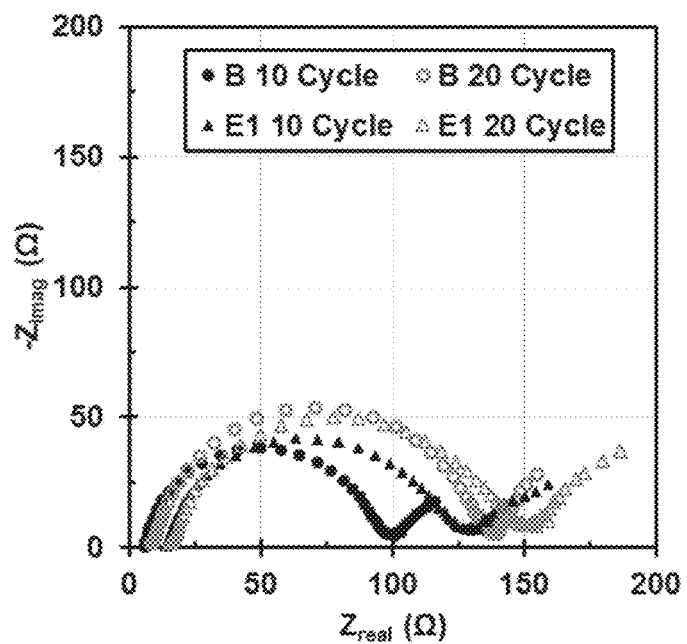
Figure 12B:
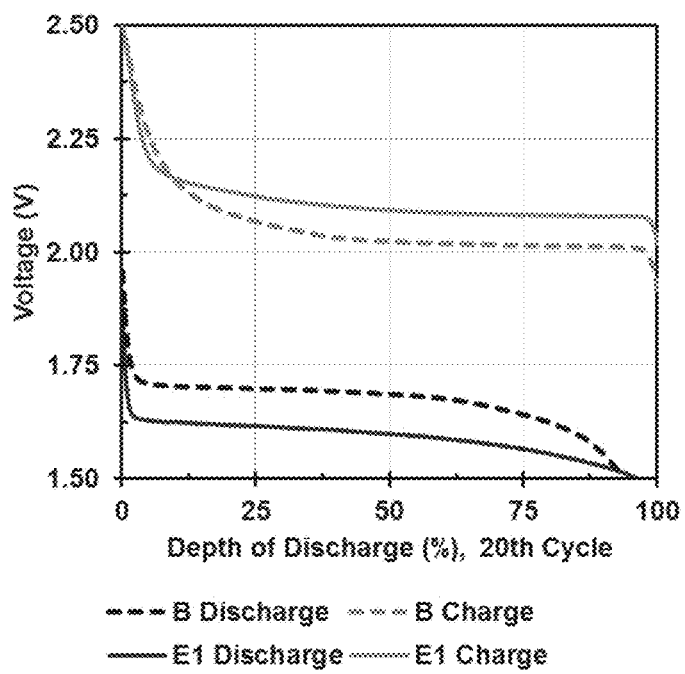

FIG. 10b and FIG. 10c shows the cell impedance spectra at the lower and upper voltage limits of the LFP/LTO cells. In particular, the cell resistance (FIG. 11a) of the B cells increased approximately 18% from cycles 10 to 20. The cell resistance for the E1 cells increased as well, but only by approximately 5%. This increase could possibly be due to the LFP particle cracking causing reduced electrical conductivity within the positive electrode. In addition, the charge transfer resistance for both the B and E1 cells significantly increased at both the upper and lower voltage limits (FIG. 11b). This result indicates that continued decomposition products are formed at the anode and cathode interfaces of the cell increasing the thickness and impedance of the SEI. FIG. 12b shows the $20^{th}$ cycle voltage versus depth of discharge for the LFP/LTO cells. It can be seen that a larger overpotential is required for the E1 cells compared to B cells for both charge and discharge at the same cycling rate. This relates directly to the lower conductivity of the electrolyte and the larger impedances found in the E1 cells compared to the B cells.

Summary of Part I

The MFE contains an organic lithium salt solvated by a volatile co-solvent and a linear organic carbonate co-solvent. HFE-7000 was selected as the volatile electrolyte co-solvent, which has a boiling point of 34° C. at 101 kPa. The low boiling point of HFE-7000 provides isothermal heat absorption at temperatures below those associated with capacity degradation (>50° C.) and thermal runaway (>70° C.). The linear organic carbonate co-solvent is ethyl methyl carbonate (EMC), was selected because it forms high ionic conductivity electrolyte mixtures with HFE-7100. HFE-7000 and EMC are used to solvate a 1.0 M concentration of lithium bis(trifluromethane sulfonyl) imide (LiTFSI) salt. LiTFSI is chosen for its high solubility and high conductivity in comparison to other organic lithium salts.

For the LTO and $Cu_2Sb$ half-cell experiments, E1 cells had greater lithiation-delithiation capacity than B cells. The greater capacity came in contrast to the greater cell resistance ($R_\Omega$) measured from impedance spectroscopy experiments. LTO half cells experienced the most change in double layer capacitance and charge transfer resistance, with dramatic increases in the double layer capacitance coupled with reduced charge transfer resistance. This improvement trend was also seen in the E1-containing $Cu_2Sb$ half cells, but to a lesser degree. LFP half cells struggled to operate reversibly for both the B and E1 electrolytes. Different capacity degradation mechanisms are proposed for each, the most pressing of which is suppressing the possibility of aluminum corrosion in E1-containing LFP/Li cells.

E1 performed comparably well to the B electrolyte in the full cell tests. Although the E1 cells had a higher cell resistance, the charge transfer resistance and double-layer capacitance were on the same order as the B cells for both full cell types, and in some instances of the $LFP/Cu_2Sb$ cells, even improved. Both cell types will benefit from improved cycling voltage limits in future experiments that better maintain the state of lithiation in the electrodes to a more reversible range.

Boiling Electrochemical Performance—Part II

Figure 15:
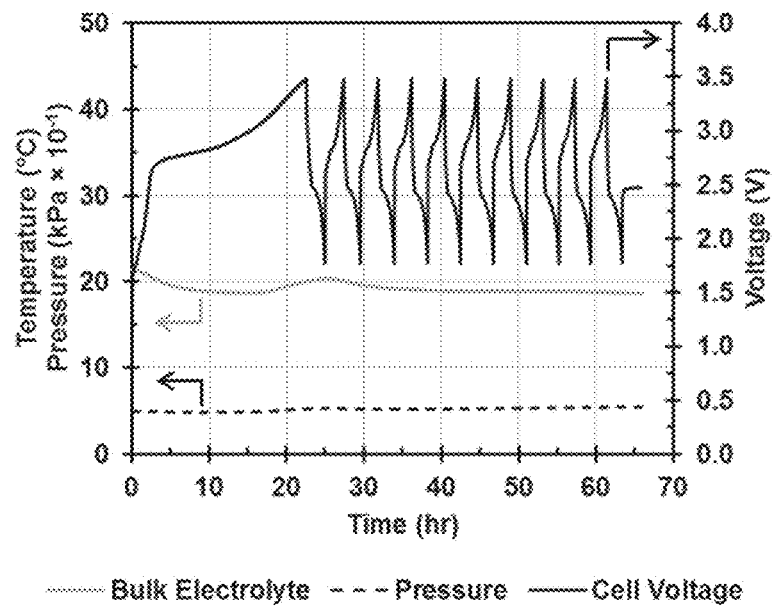
FIG. 15. Pre-Boiling Chronopotentiogram of LFP/$Cu_2$Sb Cell during Cycles 1-10 with System Temperature and Pressure Traces.
Figure 16:
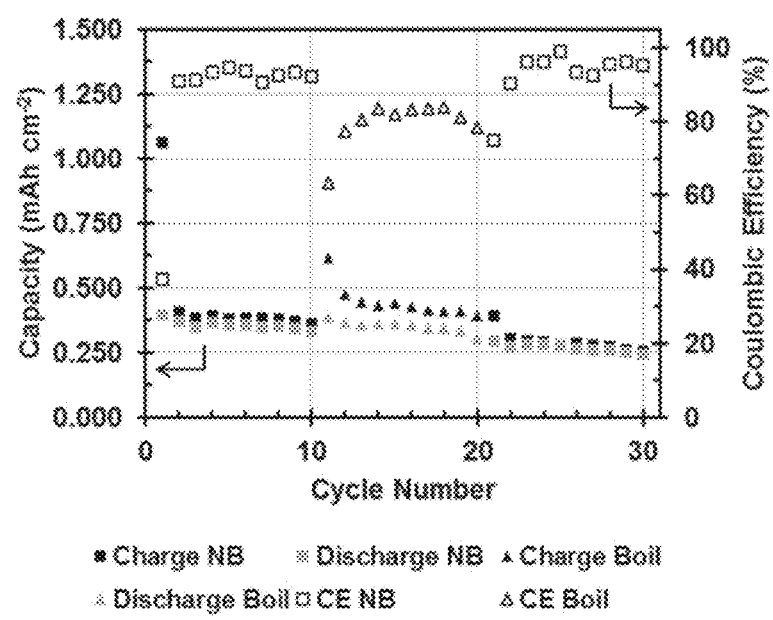
FIG. 16. LFP/$Cu_2$Sb Cell Capacity and Coulombic Efficiency versus Cycle Number.

The pre-boiling data of cycles 1-10 is shown in FIG. 15 and FIG. 16. The first charge capacity was approximately 1.06 mAh $cm^{-2}$, with a first cycle coulombic efficiency (CE) of 37.4% (FIG. 16). The CE of the $LFP/Cu_2Sb$ cell in the boiling facility was much lower than that observed in part I with the same electrode architecture in PFA T-cells (83%). The large first charge capacity loss is attributed to the formation of the SEI on both the anode and cathode interfaces as well as reactions with any surface oxides on the active materials and wetted components of the boiling facility. After cycle 10, the reversible cycling capacity was approximately 0.347 mAh cm$^{-2}$. During these cycles, the bulk electrolyte temperature and absolute pressure of the MFE were on average 19.3° C. and 51.7 kPa, respectively. HFE-7000 appears to be the primary contribution to the high vapor pressure of the MFE. HFE-7000 in pure form has a vapor pressure of 55.6 kPa at 19.3° C. The slight temperature and pressure fluctuations seen over the course of the 65 hours of this phase of the experiment are due to changes in the room temperature; these small fluctuations are present in all phases of the experiment. The cell appears to have normal operation throughout the 10 cycles and establishes an electrochemical performance baseline prior to boiling.

Figure 17:
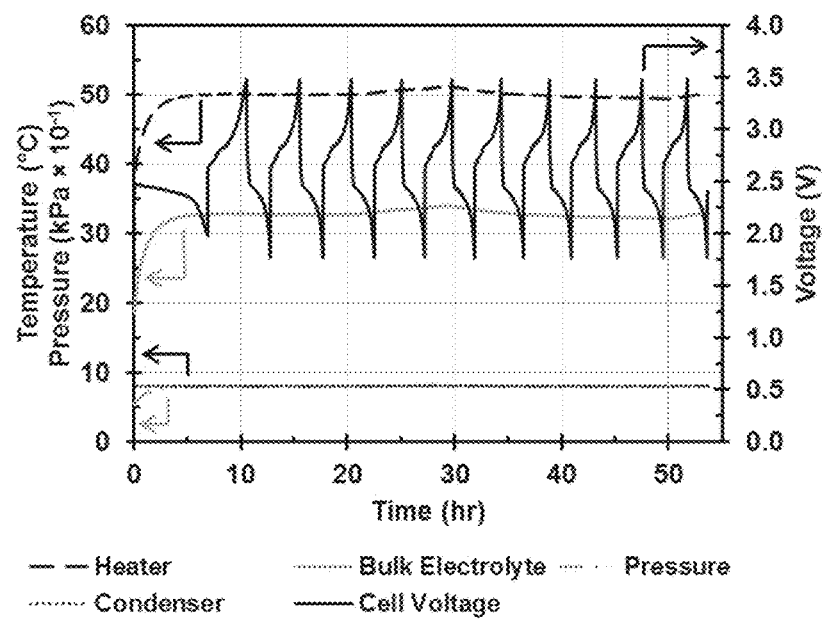
FIG. 17. Boiling Chronopotentiogram of LFP/$Cu_2$Sb Cell during Cycles 11-20 with System Temperature and Pressure Traces.

At the conclusion of cycle 10, 4 W were supplied to the thin film heater. Vapor generation was immediately observed (<1.5 seconds) in the evaporation channel once the power supply was turned on. The intensity of the vapor generation increased as both the heater and electrolyte temperatures increased. After approximately 7 hours, the heater and bulk electrolyte temperatures reach thermal equilibrium, and cycles 11-20 were started (FIG. 17). Interestingly, while the heater and bulk electrolyte temperatures increased, the voltage of the cell decreased while under open-circuit conditions. Cell thermodynamics predict the potential to increase with increasing temperature, indicating that the cell is self-discharging as the system warms to thermal equilibrium. Over the course of the 7 hours, the cell voltage dropped by approximately 0.5 V. Previously, we observed a reversible self-discharge caused by the dissolution of surface species, such as the SEI. The dissolution increases the reactivity of the active materials which, in turn, increases the rate of self-discharge. It appears this is the case for the LFP/Cu$_2$Sb cell, which has already demonstrated reduced performance in stable SEI formation with the MFE in prior non-boiling experiments.

The average heater and bulk electrolyte temperatures during cycles 11-20 were 50.0° C. and 32.9° C., respectively. The average vapor pressure during the same time was 80.19 kPa. The water circulating through the condenser remained at a constant temperature of 8° C. throughout cycles 11-20. The boiling temperature of the MFE, 32.9° C., is critical in evaluating the feasibility of the proposed internal TMS. These results show that the MFE can be continuously boiled at temperatures lower than those associated with capacity fade and thermal runaway. The isothermal heat absorption provided by boiling HFE-7000 allows the cell to maintain safe operation temperatures while effectively dissipating a very large heat flux (1.4 W cm$^{-2}$) applied to the positive electrode.

To better understand the thermal dissipation performance of the LFP/Cu$_2$Sb cell with the MFE, the applied heat flux is compared to heat flux of the cells in the Chevrolet Volt battery pack. The Chevrolet Volt battery TMS is designed to manage 0.35 kW of heat generation from the 288-15 Ah pouch cells of the pack, each of which contains 16 unit cells (two-sided cathode, separator, two-sided anode) with approximate electrode dimensions of 19.2×14.5 cm. By estimating the electrode area, and normalizing the reported heat generation, the approximate heat flux experienced by the electrodes of the cells during normal operation is 136 µW cm$^{-2}$, or four orders of magnitude lower than the heat flux experienced by the LFP/Cu$_2$Sb cell during this experiment. Therefore, the results shown in FIG. 17 represent an extreme case of heat flux, such as thermal runaway of a neighboring cell in a large battery pack. Not only did the cell manage to dissipate the heat while maintaining a safe operating temperature, it was also capable of cycling.

The chronopotentiogram in FIG. 17 and the charge-discharge capacity in FIG. 16 show the effect of the self-discharge during the 7 hour rest prior to cycle 11. The 11$^{th}$ cycle charge had a capacity of 0.616 mAh cm$^{-2}$. This is nearly double the charge capacity during the 10$^{th}$ cycle charge, 0.361 mAh cm$^{-2}$, indicating that additional electrolyte decomposition products are formed to re-passivate the active material surface. After the 11$^{th}$ cycle, the cell cycles more reversibly and the coulombic efficiency improves. However, the cell never achieves a greater coulombic efficiency than 84% during cycles 11-20. The reduced coulombic efficiency during the boiling experiments can be attributed to two different mechanisms: Li$_3$Sb formation in the Cu$_2$Sb anode and continual SEI decomposition. Li$_3$Sb has more favorable formation kinetics at higher temperatures. Cu$_2$Sb is known to have high sensitivity to the potential vs. Li/Li$^+$, and slight capacity fade is expected when cycled to potentials lower than 0.5 V vs. Li/Li$^+$. In the LFP/Cu$_2$Sb cell of this experiment, the Cu$_2$Sb anode had the limiting capacity of the two electrodes. Therefore, its potential vs. Li/Li$^+$ varied much more significantly and was more difficult to control. Potentials lower than 0.5 V vs. Li/Li$^+$ causes excess formation of Li$_3$Sb and loss of electrical contact with the surrounding copper, preventing de-intercalation of lithium. This causes a high charge capacity and a low discharge capacity. The higher cell temperatures did induce slight SEI decomposition, most notably during the self-discharge during the rest period before cycle 11. Because the higher cell temperature is maintained during the boiling, this slight SEI decomposition is expected to continue during the cycling of the cell, contributing to the lower coulombic efficiency. Evaporating HFE-7000 from the MFE appears to have a much lesser effect on the capacity fade and reduced coulombic efficiency than Li$_3$Sb formation in the anode and SEI decomposition due to higher cell temperatures. Cell voltage limits can be adjusted to better manage the capacity-limiting Cu$_2$Sb anode. Additionally, inclusion of SEI stabilizing additives in the MFE, such as EC, could help to reduce the amount of SEI decomposition when the temperature of the cell is increased.

Figure 14:
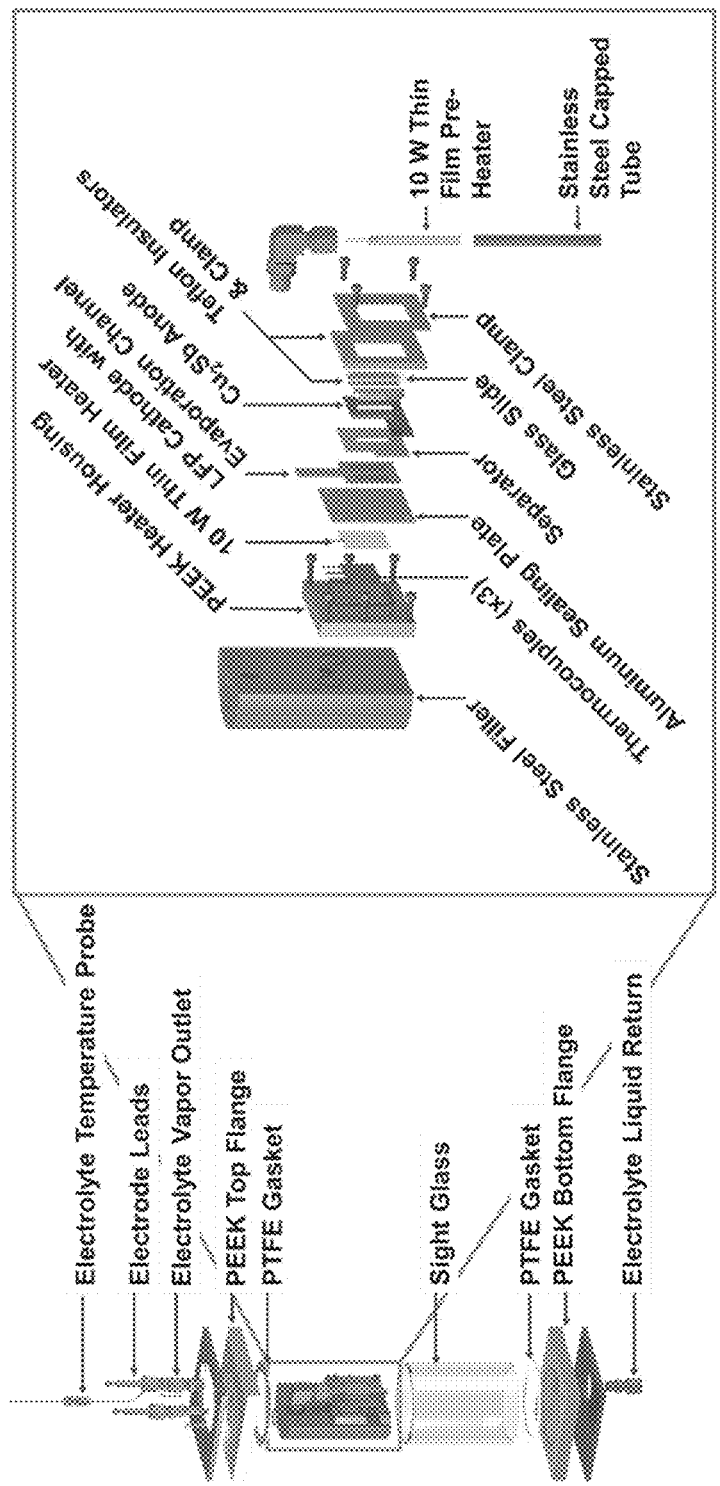
FIG. 14. Electrolyte Boiling Facility: Exploded View of the Test Section.
Figure 18:
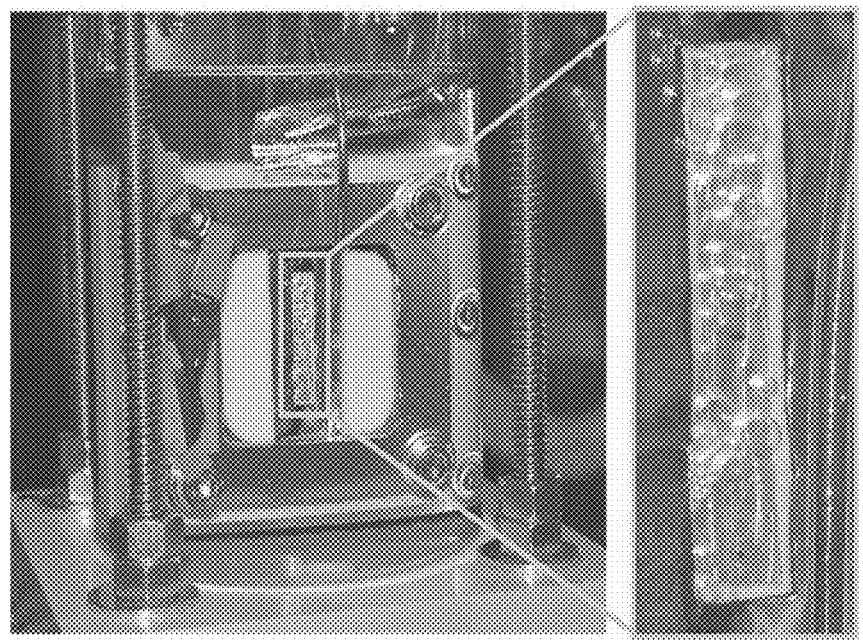
FIG. 18. View of Evaporation Channel while Cycling LFP/$Cu_2$Sb Cell at 0.5C with 4 W of Heat Input.

FIG. 18 shows a representative snapshot of the continuous vapor generation in the evaporation channel of the LFP electrode during cycles 11-20. The elongation of the bubbles indicates the boiling was confined into the channel bounded by the 1 mm thick piece of glass on the backside of the Cu$_2$Sb electrode (FIG. 14). Upon sufficient heat absorption, the vapor bubbles rapidly rose to exit the top of the channel and were just as rapidly replaced by the formation of additional vapor bubbles. The high vapor pressure of the MFE indicates that HFE-7000 accounts for the majority of the vapor phase, and therefore it is the primary constituent boiled in the channel. Visual observation showed no lithium salt precipitation at any location within the test facility, including the evaporation channel because HFEs participate minimally in the solvation of Li$^+$. Due to similarities in molecular structure of HFE-7000 and HFE-7100, the same solvation performance of Li$^+$ can be expected in the MFE. Therefore, the increased availability of HFE-7000 for evaporation, due to minimal participation in Li$^+$ solvation, further supports the feasibility of the proposed internal TMS.

Figure 19:
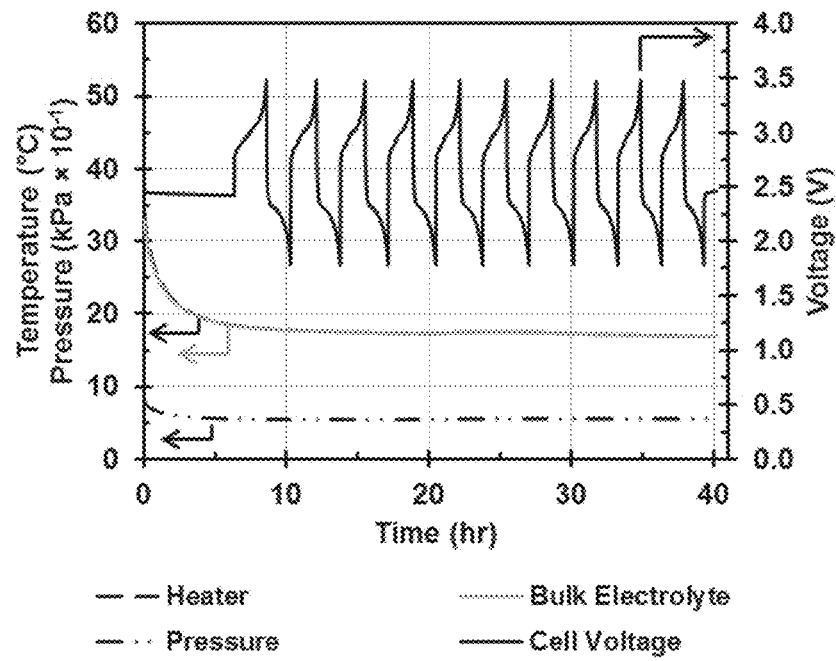
FIG. 19. Post-Boiling Chronopotentiogram of LFP/Cu$_2$Sb Cell during Cycles 21-30 with System Temperature and Pressure Traces.

FIG. 19 shows the post-boiling data collected on the LFP/Cu$_2$Sb cell. After the 7 hour rest, the bulk electrolyte cooled to an average temperature of 17.35° C. and vapor pressure of 55.57 kPa for cycles 21-30. The vapor pressure of the system increased slightly from cycles 1-10 to cycles 21-30. The small increase of 3.87 kPa is attributed to the dissolution of the SEI during the 7 hour rest prior to cycle 11. Decomposition and reformation of the SEI has been shown to produce gaseous products in the electrolyte which caused the slight increase in the electrolyte vapor pressure. The chronopotentiogram of FIG. 19 shows very similar properties to those seen in the previous 20 cycles. There appears to be a small SEI reformation capacity loss during the $21^{st}$ charge, which had a coulombic efficiency of 75.1% (FIG. 16). In subsequent cycles, the coulombic efficiency quickly recovered to >90%. The cell's return to normal function after the extreme heat flux was applied shows definite promise for the proposed internal TMS.

Figure 20:
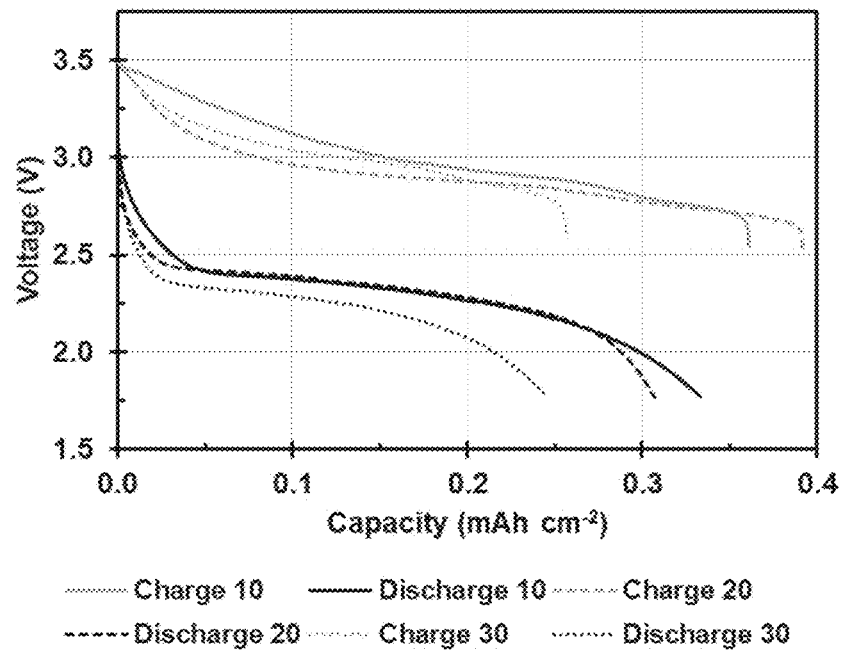
FIG. 20. LFP/Cu$_2$Sb Voltage versus Capacity for Cycles 10, 20, and 30.

The charge-discharge voltage profiles of the LFP/$Cu_2Sb$ cell during cycles 10, 20, and 30 are shown in FIG. 20. The same characteristic voltage profile observed in cycle 10, is still seen in cycles 20 and 30. This indicates the electrodes are utilizing the same capacity-producing reactions, despite the multiple reformations of the SEI on the electrode surfaces. The capacity separation of the charge-discharge profiles for each cycle is a direct indication of the coulombic efficiency of the cycle. The lowest coulombic efficiencies of the cell occurred during cycles 11-20; the $20^{th}$ cycle had a coulombic efficiency of 78.4%. The poor coulombic efficiency performance of the cell during boiling was quickly overcome once the heat was removed, rising to 98.9% during the $25^{th}$ cycle. In addition, the energy efficiency of the cell over the 30 cycles dropped slightly, from 72.9% at cycle 2 to 70.2% at cycle 30. The reduction can in energy efficiency is due to the larger overpotentials during discharge observed at cycle 30 (FIG. 20). The LFP/$Cu_2Sb$ cell did experience capacity fade over the 30 cycles; the discharge capacity of the $30^{th}$ cycle is approximately only 73.5% of the discharge capacity of the $10^{th}$ cycle. The binary MFE mixture requires additional refinement to improve its electrochemical performance. Nonetheless, the electrochemical performance demonstrated by the binary mixture under the extreme heat flux is promising for proving the validity of the proposed internal TMS.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1

The electrochemical analysis of the MFE in Part I was compared to a carbonate-only electrolyte used in conventional lithium-ion cells. In this study, a mixture of 1.0 M $LiPF_6$ in 3:7 ethylene carbonate/diethyl carbonate by weight percent (manufactured by BASF) was used, and is denoted as baseline or B electrolyte. The candidate MFE was a mixture of 1.0 M LiTFSI (Aldrich) in 1:1 HFE-7000 (3M)/EMC (Aldrich) by volume percent, denoted as candidate or E1. The HFE-7000 and EMC were degassed using a freeze-pump-thaw procedure before mixing these together with LiTFSI. The ionic conductivity of the both electrolytes was measured with a 400 series endurance contact conductivity sensor (Rosemount Analytical) with a cell constant of 1.0 $cm^{-1}$. The baseline electrolyte had an ionic conductivity of 7.26 mS $cm^{-1}$ at 22° C.

The electrochemical stability window was measured using cyclic voltammetry controlled by a Gamry Reference 3000 Potentiostat. The working electrode was glassy carbon (3 mm diameter, BASi), the counter and reference electrodes were lithium metal. The voltage was scanned at 10 mV $s^{-1}$ from the OCV (3.08 V) down to 0.5 V, up to 5 V vs. Li/$Li^+$, and back to the OCV.

The electrolytes were cycled in half and full cells with the following active materials: lithium iron phosphate ($LiFePO_4$ or LFP, Phostech), lithium titanate oxide ($Li_4Ti_5O_{12}$ or LTO, Aldrich), and copper antimonide ($Cu_2Sb$). The cells were constructed from 19 mm PFA T-fittings (Entegris) with the following architecture: electrode/separator (PP/PE, MTI)/glass paper (Whatman)/separator/lithium metal (half cells) or counter electrode (full cells). Electrical contact was made with the electrodes using polished 19 mm aluminum (LFP electrodes), copper (LTO and $Cu_2Sb$ electrodes), and stainless steel rods (lithium). The LFP electrode slurry contained 77.5% LFP, 1.1% ADX 161 PVDF (Kynar, aluminum current collector binder), 6.4% 761 PVDF (Kynar, particle binder), 5.3% Super C65 (Timcal, conductive additive), and 9.7% KS6 graphite (Timcal, conductive additive) by weight percent suspended with NMP solvent (Aldrich). The LFP slurry was coated onto 25 μm aluminum foil and calendared to a final total thickness of approximately 100 μm with an average loading of 7.3 mg $cm^{-2}$. The LTO electrode slurry contained 74.3% LTO, 1.7% ADX 161 PVDF, 9.6% 761 PVDF, 5% Super C65, and 9.4% KS6 graphite suspended with NMP solvent. The LTO slurry was coated onto a 15 μm copper foil and calendared to a final total thickness of approximately 55 μm with an average loading of 4.1 mg $cm^{-2}$. The $Cu_2Sb$ electrodes were produced at Prieto Battery using room temperature aqueous electrodeposition onto a 15 μm copper foil substrate by a process described by Mosby, et al (*J. Am. Chem. Soc.*, 130, 10656, 2008). The $Cu_2Sb$ coating thickness was approximately 3 μm with an average loading of 2.1 mg $cm^{-2}$. All electrodes were punched into 19 mm disks and vacuum dried overnight for cell assembly in an argon glove box with <0.5 ppm of $O_2$ and $H_2O$ (MBraun).

Each cell combination was cycled on a BT-2143 battery tester (Arbin) at an approximate 0.5C rate for a total of 20 cycles in an environmental chamber (Tenney) held at 25° C. The current applied for each cell combination varied as did the cell voltage limits: 386 μA $cm^{-2}$ for LFP/Li cells between 2.5 and 4 V vs. Li/$Li^+$; 386 μA $cm^{-2}$ for LTO/Li cells between 1 and 2 V vs. Li/$Li^+$; 87.7 μA $cm^{-2}$ for $Cu_2Sb$/Li cells between 0.5 and 0.95 V vs. Li/$Li^+$; 291 μA $cm^{-2}$ for LFP/LTO cells between 1.5 and 2.5 V; and 175 μA $cm^{-2}$ for LFP/$Cu_2Sb$ cells between 1.75 and 3.5 V. In addition, the $Cu_2Sb$/Li and LFP/$Cu_2Sb$ cells were cycled at an approximate 0.1C rate for the first lithiation, 17.54 μA $cm^{-2}$ (half cells); or first charge, 52.63 μA $cm^{-2}$ (full cells). For each cell combination, a minimum of three cells were tested. After 10 and 20 cycles, each cell underwent potentiostatic electrochemical impedance spectroscopy (EIS) at the upper and lower voltage limits to compare the impedance of the electrode-electrolyte interface of the baseline and candidate electrolyte for each electrode combination. During EIS, a 5 $mV_{rms}$ signal was applied between the frequencies 0.1 Hz and 100 kHz. The resulting impedance data was fit with the equivalent circuit model shown in FIG. 2 that includes a constant phase element (CPE) in place of a capacitor to better fit the measured data.

Example 2

Figure 13:
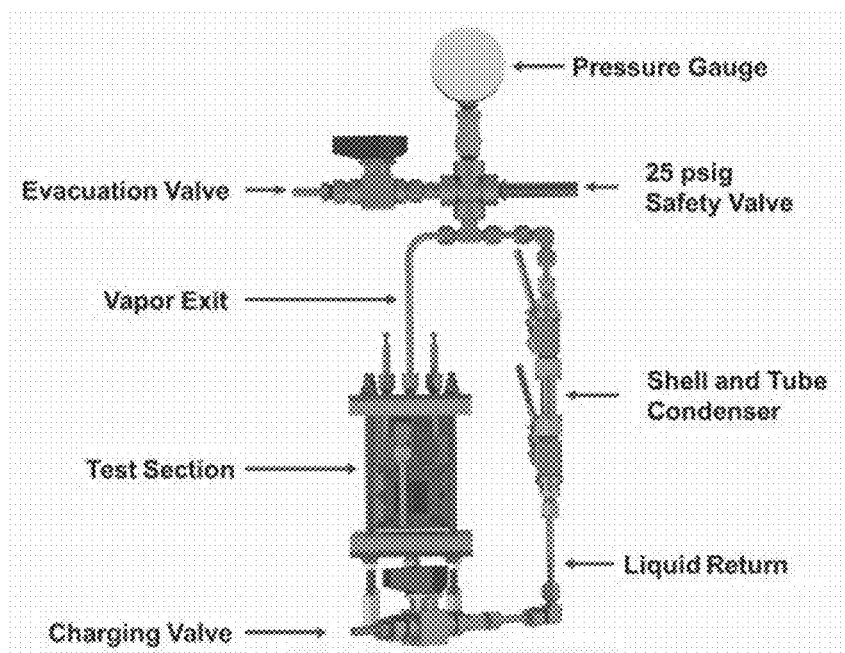
FIG. 13. Electrolyte Boiling Facility.

To evaluate the thermal and electrochemical performance of the boiling MFE in a LFP cathode and $Cu_2Sb$ anode cell (Part II), a custom electrolyte boiling facility was constructed, shown in FIG. 13. The facility uses a 10 W thin film heater (25.4×25.4 mm, Omega) to interface with the backside of the LFP electrode, which contains a single evaporation channel in the center of the active material coating. The facility and $Cu_2Sb$ electrode were designed to provide direct viewing through a sight glass of the vapor generation channel of the LFP electrode. The thin film heater simulates extreme heat generation in a LIB to continuously generate vapor in the LFP electrode channel while the cell is cycled. It is important to note that the applied heat is not representative of normal heat generation in a LIB, which is typically on the order of 100 W $L^{-1}$, but is intended to represent thermal runaway of neighboring cells in a worst case heating scenario. The surrounding infrastructure of the test facility mimics a loop heat pipe. All generated vapor is routed out of the test section through 6.35 mm tubing and into a shell-and-tube water-cooled condenser that is connected to the test section.

The facility utilizes T-type thermocouples to make several temperature measurements, all of which were 7-point water bath calibrated from 0-90° C. using an internal platinum resistance thermometer standard with a NIST-traceable calibrated uncertainty of ±0.012° C. Three surface thermocouples are placed on the backside of the 10 W thin film heater, and the reported data for the heater temperature is an average of these three measurements. The maximum temperature difference between the lowest and highest measured temperature between the three thermocouples was 1.55° C. The electrolyte bulk temperature is measured just outside of the vapor generation channel using a 1.6 mm stainless steel probe thermocouple (shown in FIG. 17). The water condenser inlet and outlet temperatures are measured with 6.35 mm stainless steel NPT embedded thermocouples. Additionally, the vapor pressure of the MFE is measured with a 0-345 kPa pressure transmitter with an accuracy of ±0.25% of the measurement. A 0-60 V, 6 A maximum variable DC power supply (Instek SPS-606) provides power to the thin film heater. A 250 W re-circulating water chiller (Thermo Scientific LC 250) is interfaced with the shell-and-tube condenser.

Particular attention was given to the selection of electrolyte-wetted materials used in the facility. The only wetted materials are 316 stainless steel, 3003 aluminum, unfilled PEEK plastic, PTFE Teflon, and Parker compound FF500-75 (used for all o-rings). All wetted metallic components except for tubing were hand polished with Wenol metal polish. All components (metallic and non-metallic) were then cleaned with the following solvents in the specified order: acetone, methanol, and isopropanol. Finally, all components were vacuum dried overnight at 80° C. before final assembly in an argon glove box.

The MFE electrolyte was prepared in an argon glove box (<0.5 ppm $O_2$ and $H_2O$, MBraun). The HFE-7000 (3M) and EMC (Aldrich) solvents were degassed using the freeze-pump-thaw procedure prior to mixing. The LiTFSI salt (Aldrich) was used as received. A 1.0 M concentration of LiTFSI salt was solvated into a mixture containing 1:1 HFE-7000/EMC by volume. Approximately 100 mL of electrolyte was mixed in a glass jar with a cap modified to contain a dip tube. The tube extended to the bottom of the jar, allowing for only the liquid phase of the electrolyte to be drawn into the boiling facility.

The LFP/$Cu_2Sb$ full cell was capacity-limited by the $Cu_2Sb$ electrode. The LFP electrode contains two rectangular patches (19.1×7.62 mm) of active material separated by 6.35 mm to create a vapor generation channel (FIG. 14). The LFP electrode slurry contained 77.5% LFP (Phostech), 1.1% ADX 161 PVDF (Kynar, aluminum current collector binder), 6.4% 761 PVDF (Kynar, particle binder), 5.3% Super C65 (Timcal, conductive additive), and 9.7% KS6 graphite (Timcal, conductive additive) by weight percent suspended with NMP solvent (Aldrich). The LFP slurry was applied to a 50 μm aluminum foil cut to its final shape. The electrode was calendared to a total thickness of 93 μm with an active material weight of 0.0225 g. The $Cu_2Sb$ electrodes were fabricated by direct electrodeposition onto 25 μm copper foil by a process described by Mosby, et al (*J. Am. Chem. Soc.*, 130, 10656, 2008). Prior to electrodeposition, a 19.1×5.6 mm window was cut into the center of the copper foil to allow for direct viewing of the evaporation channel on the LFP electrode. Kapton tape was used to mask all submerged portions of the copper foil in the deposition electrolyte except for two locations of the same approximate area of 19.1×7.62 mm on either side of the window, upon which 3 μm of $Cu_2Sb$ was deposited. The $Cu_2Sb$ electrode contained approximately 0.0130 g of active material. A 31.8 mm tall×11.1 mm wide×1 mm thick piece of borosilicate glass was placed on the backside of the $Cu_2Sb$ electrode to confine any bubbles nucleated during the boiling process to the evaporation channel only (FIG. 14). A 25 μm polypropylene/polyethylene separator (MTI) was cut to ensure no electrical shorting between the anode and cathode and obstruction of the LFP evaporation channel.

The assembly of the electrolyte boiling facility was accomplished in two phases: outside and inside the argon glove box. Outside of the glove box, the test section was assembled. This portion of the assembly included all components seen in FIG. 14. To help with positioning the electrodes and separator, strapping tape (10 mm wide×0.03 mm thick, MTI) was used. Upon completion of the test section, all components were pumped into the glove box. The test section was connected to the surrounding loop heat pipe structure, the condenser water lines were connected to the re-circulating chiller, all data acquisition was wired, and the electrodes leads were connected to a potentiostat (Gamry, used for all experiments). Finally, the electrolyte boiling facility was evacuated with a vacuum pump, sealed, and charged with the liquid MFE contained in the glass jar with a dip tube. Using this method, the only components comprising the vapor phase of the system were constituents of the MFE mixture. The required volume of electrolyte to completely submerge the LFP and $Cu_2Sb$ electrodes contained in the test section was approximately 75 mL. Although large compared to the amount of active material contained in the cell, the electrolyte fill volume was the consequence of designing the facility to enable visual and quantitative boiling measurements. Future investigations will reduce the electrolyte fill to more practical levels.

Previous testing with the electrolyte boiling facility determined that 4 W of power supplied to the thin film heater was sufficient to produce continuous vapor generation in the channel of the positive electrode with the MFE. The LFP/$Cu_2Sb$ cell cycling voltage limits were 1.75-3.5 V. The testing procedure was split into three segments: pre-boiling cycling, boiling and cycling, and post-boiling cycling. The pre-boiling cycling was accomplished in cycles 1-10. The cell was cycled with a first charge current of 51.7 μA $cm^{-2}$. All remaining cycles were performed with a cycling current of 172 μA $cm^{-2}$, which is approximately a 0.5C rate. Cycles 1-10 are used to establish an electrochemical performance baseline prior to boiling the MFE. After the completion of cycle 10, the DC power supply is turned on to apply 4 W to the thin film heater, the condenser inlet water temperature is set to 8° C., and the cell is placed on a 7 hour rest for thermal steady-state conditions to be achieved. After the rest, the cell is cycled 10 times while the MFE is continuously boiled (cycles 11-20). Upon the completion of cycle 20, the power supply is turned off and the cell is placed on a 7 hour rest for thermal steady-state conditions to be achieved. Once cooled back to room temperature, the cell is cycled 10 more times (cycles 21-30) to assess the electrochemical impact of the boiling electrolyte during cycles 11-20.

SUMMARY

The electrochemical performance of a 1.0 M LiTFSI binary electrolyte mixture containing HFE-7000, a volatile co-solvent, was compared to a 1.0 M $LiPF_6$ EC/DEC baseline electrolyte. The electrochemical stability on a glassy carbon electrode showed that the candidate E1 electrolyte had improved oxidative and reductive stability compared to the baseline. In half cell tests with $Cu_2Sb$ and LTO anode active materials, the candidate electrolyte exceeded the charge-discharge capacity of the baseline electrolyte. Impedance spectroscopy testing showed E1-containing cells had higher cell resistance due to lower ionic conductivity, but, in some instances, had reduced charge transfer resistance and increased double-layer capacitance compared to the baseline. Half-cell tests with LFP showed the HFE-7000 in the E1 electrolyte is not effective at passivating the aluminum current collector to the LiTFSI salt. Additional refinement to the E1 electrolyte can minimize these irreversible reactions. Full cell tests showed that the E1 electrolyte is capable of cycling, and, due to its reduced surface tension and viscosity, had in many case higher capacity that cells with the baseline electrolyte and better performance ionic conductivity than electrolytes with hydrofluorethers reported in the literature.

The thermal and electrochemical performance of a MFE containing a volatile co-solvent, HFE-7000, has been demonstrated in a boiling facility containing a $LFP/Cu_2Sb$ cell. Under continuous vapor generation in the channel of the LFP electrode, the cell was capable of cycling with an average coulombic efficiency of 80%. The coulombic efficiency loss during boiling compared to non-boiling, is attributed to $Li_3Sb$ formation in the $Cu_2Sb$ anode and continual SEI decomposition at the higher temperatures of the cell. Boiling the MFE is not believed to be a significant source of the capacity fade seen in the cell. The proposed internal TMS that relies on evaporating HFE-7000 from MFE mixture has proven to be feasible. The heat flux applied to the cell to induce the continual vapor generation far exceeded the internal heat generation of a LIB during normal operation.

The electrochemical performance of the MFE can be evaluated with other high energy electrodes including a graphite negative electrode and $LiCoO_2$, $LiNi_{0.8}Co_{0.15}Al_{0.05}O_2$, and $LiNi_{1/3}Mn_{1/3}Co_{1/3}O_2$, among other positive electrodes. Utilizing these active materials, particularly graphite, can include the addition of SEI stabilizing additives such as EC and $LiPF_6$ into the MFE mixture.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. An internally refrigerated electrochemical cell comprising:
    an electrode perfused with one or more flow channels;
    a liquid wicking structure embedded within at least one flow channel; and
    an inert refrigerant that permeates through the wicking structure, and is miscible, partially miscible, or non-miscible with an electrolyte in an electrochemical cell;
    wherein when the temperature of the battery exceeds a safe limit,
    a) a refrigerant within the wicking structure phase-changes to a vapor by absorbing thermal energy;
    b) the vapor is released to a condenser by passing through the flow channels in the perfused electrode;
    c) the refrigerant vapor phase-changes to a liquid-phase by condensing in the condenser; and
    d) the condensed refrigerant recycles by returning to the flow channels by the wicking structures;
    wherein the electrochemical cell temperature is regulated by a cycle of a) to d) of absorbing thermal energy, passing the vapors of refrigerant through flow channels in the electrode, condensing the vapors to the liquid-phase, and returning the condensed refrigerant to the flow channels, thereby cooling the electrochemical cell internally.

2. The apparatus of claim 1 wherein the wicking structure comprises an etched channel, a machined channel, a sintered metal powder, a wire mesh, a ceramic, or a polymer.

3. The apparatus of claim 1 wherein the refrigerant comprises HFE-7000, HFE-7100, HFE-7200, HFE-7300, HFE-7600, FC-72, perflenapent, R134a, a R400 refrigerant, or a R700 refrigerant.

4. The apparatus of claim 1 wherein the refrigerant has a boiling point less than about 90° C.

5. The apparatus of claim 1 wherein the electrolyte comprises ethyl methyl carbonate, diethyl carbonate, dimethyl carbonate, ethylene carbonate, propylene carbonate, vinylene carbonate, fluoroethylene carbonate, or an organic ionic liquid.

6. The apparatus of claim 1 wherein the electrolyte comprises a lithium salt, wherein the concentration of the lithium salt ranges from about 0.1 molar to about 2 molar, or about 0.1 molal to about 2 molal.

7. The apparatus of claim 1 wherein the electrolyte comprises lithium hexafluorophosphate ($LiPF_6$), lithium hexafluoroarsenate ($LiAsF_6$), lithium bis(oxalate)borate ($LiB(C_2O_4)_2$), lithium triflate ($Li\ SO_3CF_3$), lithium bis(trifluromethylsulfonyl)imide (LiTFSI), lithium bis(pentafluroethylsulfonyl)imide (LiBETI), lithium nonafluorobutylsulfonyl trifluoromethylsulfonyl imide (LiFBMS), or a combination thereof.

8. The apparatus of claim 1 wherein the electrode perfused with one or more flow channels comprises the positive electrode, or the negative electrode.

9. The apparatus of claim 1 wherein the flow channels have a cross-sectional area defined by a first dimension in the range of about 10 μm to about 200 μm, and a second dimension in the range of about 10 μm to about 10 mm.

10. The apparatus of claim 1 wherein the flow channels have an aspect ratio of about 1:1 to about 100:1, or the flow channels have a radius of about 10 µm to about 10 mm.

11. The apparatus of claim 1 wherein the flow channels have a volume of about 1 percent to about 20 percent of the volume of the electrode.

12. The apparatus of claim 1 wherein the condenser conductively transfers heat to the outer surface of the cell.

13. The apparatus of claim 1 wherein the safe limit of the electrochemical cell is below a temperature of 60° C.

14. The apparatus of claim 1 wherein internal cooling of the electrochemical cell inhibits the temperature of the electrochemical cell exceeding 80° C. and avoiding a thermal runaway.

15. The apparatus of claim 1 wherein the electrolyte comprises a lithium organo-imide salt dissolved in about equal volumes of an organic carbonate and the refrigerant to form a homogeneous solution.

16. The apparatus of claim 1 wherein the electrolyte comprises a homogeneous liquid solution of a lithium organo-imide salt, an organic carbonate, and an optional solid electrolyte interphase stabilizer, and wherein the homogeneous liquid solution is in contact with the refrigerant.

17. The apparatus of claim 1 wherein the refrigerant and the electrolyte are in a ratio of about 1:1.

18. The apparatus of claim 1 wherein one or more refrigerated electrochemical cells form a battery.

19. The apparatus of claim 18 wherein one or more refrigerated electrochemical cells comprise lithium iron phosphate ($LiFePO_4$), lithium nickel cobalt aluminum oxide ($LiNiCoAlO_2$), lithium manganese oxide ($LiMn_2O_4$, or $Li_2MnO_3$), lithium nickel manganese cobalt oxide ($LiNiMnCoO_2$), lithium cobalt oxide ($LiCoO_2$), copper antimony ($Cu_2Sb$), lithiated graphite ($LiC_6$), lithium titanate ($Li_2TiO_3$, or $Li_4Ti_5O_{12}$), or lithium sulfur ($Li_2S$).

20. The apparatus claim 18 wherein operation of the battery results in heat formation, wherein a continuous cycle of a) to d) of absorbing thermal energy, passing the vapors of the refrigerant through flow channels in the electrode, condensing the vapors to the liquid-phase, and returning the condensed refrigerant to the flow channels thereby cools the battery internally by absorbing thermal energy from a charging or a discharging electrode.

* * * * *